(12) United States Patent
Lee et al.

(10) Patent No.: US 9,736,282 B2
(45) Date of Patent: Aug. 15, 2017

(54) ELECTRONIC DEVICE HAVING THROUGH-HOLE FORMED THEREIN

(71) Applicant: Samsung Electronics Co., Ltd., Gyeonggi-do (KR)

(72) Inventors: Sung-Young Lee, Gyeongsangbuk-do (KR); Tae-Hwan Kang, Gyeongsangbuk-do (KR); Jung-Ho Chun, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/054,844

(22) Filed: Feb. 26, 2016

(65) Prior Publication Data

US 2016/0255182 A1 Sep. 1, 2016

(30) Foreign Application Priority Data

Feb. 27, 2015 (KR) .......................... 10-2015-0028638

(51) Int. Cl.
*H04M 1/00* (2006.01)
*H04M 1/02* (2006.01)
*H04B 7/00* (2006.01)

(52) U.S. Cl.
CPC .................................. *H04M 1/026* (2013.01)

(58) Field of Classification Search
CPC ................................ G01D 7/00; G01D 7/005
USPC .................................. 455/575.1, 575.8; 73/73
See application file for complete search history.

(56) References Cited

U.S. PATENT DOCUMENTS

| | | | |
|---|---|---|---|
| 8,210,032 B2 | 7/2012 | Sanford et al. | |
| 2012/0137959 A1 | 6/2012 | Kwak | |
| 2013/0052848 A1 | 2/2013 | Sloey et al. | |
| 2014/0260571 A1* | 9/2014 | Stevens | G01N 31/222 73/73 |

FOREIGN PATENT DOCUMENTS

KR 10-2012-0063132 A 6/2012

* cited by examiner

*Primary Examiner* — Lee Nguyen
(74) *Attorney, Agent, or Firm* — Cha & Reiter, LLC.

(57) ABSTRACT

According to various embodiments of the present disclosure, an electronic device may include: an external housing having a through-hole that connects the inside and the outside of the portable electronic device; a first structure that is accommodated in a space of the external housing and has an opening and a passage, wherein the opening is disposed adjacent to the through-hole and the passage extends in a first direction and is connected to the opening; a second structure that is accommodated in the space of the external housing and disposed adjacent to the first structure, and has a portion directed toward the through-hole; and a material that is located on the portion of the second structure so as to be visible from the outside through the through-hole and changes color in reaction to contact of a fluid. In addition, various other embodiments can be made.

19 Claims, 27 Drawing Sheets

ELECTRONIC DEVICE HAVING THROUGH-HOLE FORMED THEREIN

CLAIM OF PRIORITY

The present application is related to and claims the priority under 35 U.S.C. §119(a) to Korean Application Serial number 10-2015-0028638, which was filed in the Korean Intellectual Property Office on Feb. 27, 2015, the entire content of which is hereby incorporated by reference.

TECHNICAL FIELD

Various embodiments of the present disclosure relate to an electronic device having a through-hole formed therein.

BACKGROUND

Recently, electronic devices (e.g., portable electronic devices, smart phones, electronic organizers, personal compound electronic devices, laptop computers, etc.) have become necessities of modern life and have become an important means for transferring rapidly changing information thanks to the development of electronic communication industries.

Electronic devices are equipped with various electronic components in order to provide various functions. For example, electronic devices are equipped with display modules in order to provide a Graphical User Interface (GUI) environment. Alternatively, electronic devices are equipped with stereo speaker modules in order to provide a function of listening to music using stereo sound. In another case, electronic devices are equipped with camera modules in order to provide a photographing function. In yet another case, electronic devices are equipped with communication modules in order to provide a function of communicating with other electronic devices through a network.

In general, the electronic devices have housings that form the external appearance thereof, and the aforementioned electronic components are protected by the housings.

SUMMARY

The aforementioned electronic devices, which are expensive, may require a considerable cost when they breakdown as a result of a user's carelessness, which can be a burden for the users. There are several types of breakdowns. In particular, when water flows into the electronic devices, various circuits and components may be damaged due to an overcurrent caused by the infiltrated water. However, in order to identify the infiltration of water into the electronic devices, the electronic devices may have to be disassembled, and malfunctions due to the infiltration of water are not suspected until there are abnormalities in the electronic devices.

In order to solve the aforementioned problem, various embodiments of the present disclosure provide an electronic device that can easily recognize the infiltration of water thereinto.

For this purpose, an electronic device, according to an embodiment of the present disclosure, may include: an external housing having a through-hole that connects the inside and the outside of the portable electronic device; a first structure that is accommodated in a space of the external housing and has an opening and a passage, wherein the opening is disposed adjacent to the through-hole and the passage extends in a first direction and is connected to the opening; a second structure that is accommodated in the space of the external housing and disposed adjacent to the first structure, and has a portion directed toward the through-hole; and a material that is located on the portion of the second structure so as to be visible from the outside through the through-hole and changes color in reaction to contact of a fluid.

According to the various embodiments of the present disclosure, the infiltration of water into the electronic device can be easily recognized even without disassembling the electronic device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

The above and other aspects, features, and advantages of the present disclosure will be more apparent from the following detailed description taken in conjunction with the accompanying drawings, in which.

DETAILED DESCRIPTION

Figure 1:
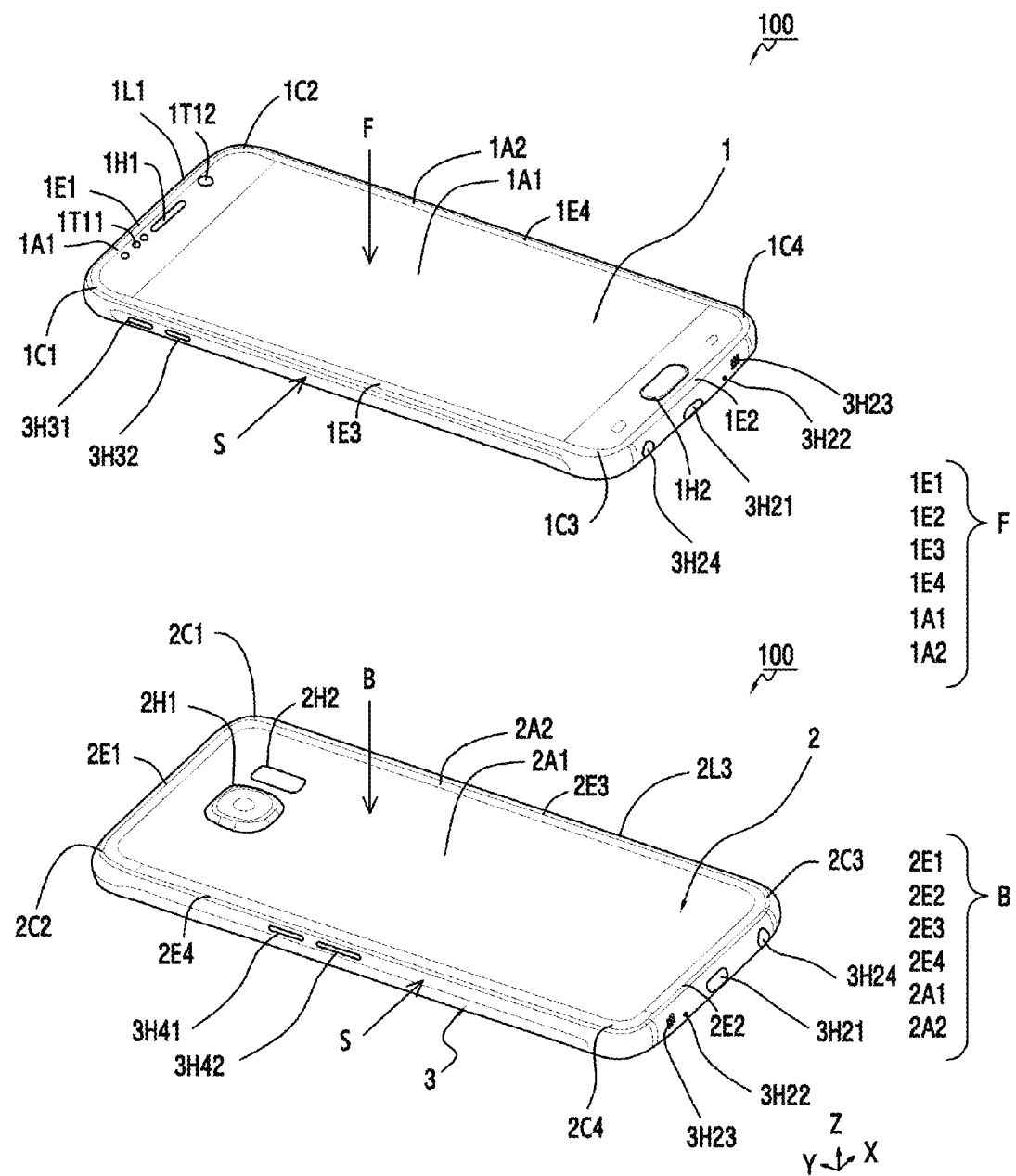
FIG. 1 is a perspective view of an electronic device according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Certain headings are used in this document that describe the material indicated in the heading. It shall be understood that the description of the material indicated in the heading is not limited to just the portion under the heading and may be described in other places of this document, and documents incorporated by reference.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Certain embodiment of the present disclosure can include portable electronic device comprising an external housing having a through-hole that connects the inside and the outside of the electronic device; a first structure that is accommodated in the space of the external housing and has an opening and a passage, wherein the opening is disposed adjacent to the through-hole and the passage extends in a first direction and is connected to the opening; a second structure that is accommodated in the space of the external housing and disposed adjacent to the first structure, and has a portion directed toward the through-hole; and a material that is located on the portion of the second structure so as to be shown from the outside through the through-hole and changes color in reaction to contact of a fluid.

The external housing in accordance with certain embodiments will be described in FIGS. 1 through 6H.

External Housing

Figure 2:
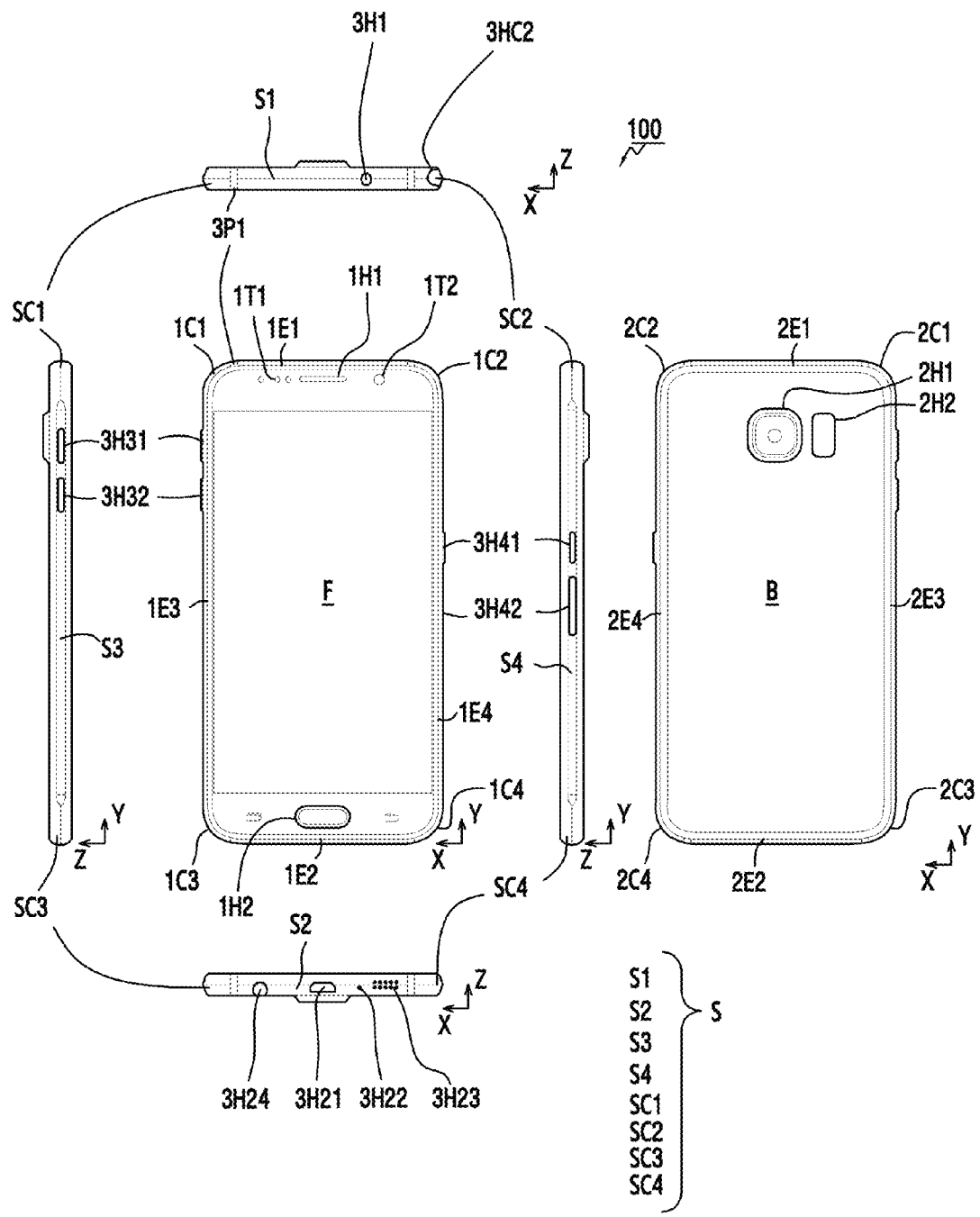
FIG. 2 is six orthogonal views of the electronic device according to the embodiment of the present disclosure.

FIG. 1 is a perspective view of an electronic device according to an embodiment of the present disclosure. FIG. 2 is six orthogonal views of the electronic device according to the embodiment of the present disclosure.

Referring to FIGS. 1 and 2, according to the embodiment, the electronic device 100 may have a substantially rectangular shape and may include a front cover 1 that forms the front surface F thereof and a back cover 2 that forms the back surface B thereof. Further, the electronic device 100 may include a bezel 3 that surrounds the space between the front cover 1 and the back cover 2. In addition, the electronic device 100 may include a display that is embedded in the space formed by the front cover 1 and the back cover 2. Here, the screen area of the display may be shown to the outside through the front cover 1.

In certain embodiments, the electronic device 100 may include an external housing. The external housing can include the front cover 1 having the front surface F, the back cover 2 that having the back surface B. The front cover 1 and the back cover 2 may have an internal space between the front cover 1 and the back cover 2. The external housing may also include a side wall, such as the bezel 3 that surrounds the internal space formed between the front cover 1 and the back cover 2. The bezel 3 may include throughholes 3H21, 3H22, 3H23, and 3H24.

According to various embodiments, the front cover 1 and/or the back cover 2 may be formed of glass.

According to various embodiments of the present disclosure, the bezel 3 may be formed of non-metal or metal.

According to various embodiments of the present disclosure, the front surface F of the electronic device 100 may include a first edge 1E1, a second edge 1E2, a third edge 1E3, and a fourth edge 1E4. The first edge 1E1 and the second edge 1E2 may be opposite to each other, and the third edge 1E3 and the fourth edge 1E4 may be opposite to each other. The third edge 1E3 may connect one end portion of the first edge 1E1 and one end portion of the second edge 1E2. Further, the fourth edge 1E4 may connect the other end portion of the first edge 1E1 and the other end portion of the second edge 1E2.

According to various embodiments of the present disclosure, the first edge 1E1, the second edge 1E2, the third edge 1E3, or the fourth edge 1E4 may be linear as illustrated in FIGS. 1 and 2, or may also be curvilinear without being limited thereto.

According to an embodiment of the present disclosure, the front surface F may include a first corner edge 1C1 through which the first and third edges 1E1 and 1E3 are connected to each other. The front surface F may include a second corner edge 1C2 through which the first and fourth edges 1E1 and 1E4 are connected to each other. The front surface F may include a third corner edge 1C3 through which the second and third edges 1E2 and 1E3 are connected to each other. Further, the front surface F may include a fourth corner edge 1C4 through which the second and fourth edges 1E2 and 1E4 are connected to each other.

According to an embodiment of the present disclosure, the front surface F may include a central area 1A1 that is substantially the same as the screen area of the display. The central area 1A1 may be a flat or curved surface. Further, the central area 1A1 may have a substantially rectangular shape and may be transparent so that an image in the screen area of the display can be shown to the outside.

According to an embodiment of the present disclosure, the front surface F may include an edge area 1A2 that surrounds the central area 1A1. The edge area 1A2 may have a substantially rectangular ring shape. Further, the edge area 1A2 may represent a color. For example, the edge area 1A2 may represent a similar or different color from the bezel 3.

According to various embodiments of the present disclosure, the front cover 1 may have a through-hole 1H1 for supporting a speaker or a receiver that is equipped to the electronic device 100. A sound from the speaker or the receiver may be sent out through the through-hole 1H1.

According to various embodiments of the present disclosure, the front cover 1 may include one or more transparent areas 1T11 and 1T12 for supporting optical components (e.g., an illumination sensor, an image sensor, etc.) that are equipped to the electronic device 100. External light may be input to the optical components through the transparent areas 1T11 and 1T12.

According to various embodiments of the present disclosure, the front cover 1 may have a through-hole 1H2 for supporting a button that is equipped to the electronic device 100. The button may be exposed to the outside through the through-hole 1H2.

According to various embodiments of the present disclosure, the back surface B of the electronic device 100 may include a first edge 2E1, a second edge 2E2, a third edge 2E3, and a fourth edge 2E4. The first edge 2E1 and the second edge 2E2 may be opposite to each other, and the third edge 2E3 and the fourth edge 2E4 may be opposite to each other. The third edge 2E3 may connect one end portion of the first edge 2E1 and one end portion of the second edge 2E2. Further, the fourth edge 2E4 may connect the other end portion of the first edge 2E1 and the other end portion of the second edge 2E2.

According to various embodiments of the present disclosure, the first edge 2E1, the second edge 2E2, the third edge 2E3, or the fourth edge 2E4 may be linear as illustrated in FIGS. 1 and 2, or may also be curvilinear without being limited thereto.

According to an embodiment of the present disclosure, the back surface B may include a first corner edge 2C1 through which the first and third edges 2E1 and 2E3 are connected to each other. The back surface B may include a second corner edge 2C2 through which the first and fourth edges 2E1 and 2E4 are connected to each other. The back surface B may include a third corner edge 2C3 through which the second and third edges 2E2 and 2E3 are connected to each other. Further, the back surface B may include a fourth corner edge 2C4 through which the second and fourth edges 2E2 and 2E4 are connected to each other.

According to an embodiment of the present disclosure, the back surface B may include a central area 2A1 and an edge area 2A2 that surrounds the central area 2A1. The central area 2A1 may have a substantially rectangular shape and may include a flat or curved surface. The edge area 2A2 may have a substantially rectangular ring shape. The edge area 2A2 may include a curved surface.

According to various embodiments of the present disclosure, the back surface B may represent a color. For example, the back surface B may represent a similar or different color from the bezel 3.

According to various embodiments of the present disclosure, the back cover 2 may have a through-hole 2H1 for a camera that is equipped to the electronic device 100. The camera may be exposed to the outside through the through-hole 2H1. Further, the back cover 2 may have a through-hole or a transparent area 2H2 for a flash that is equipped to the electronic device 100. Light from the flash may be emitted to the outside through the through-hole or the transparent area 2H2.

According to an embodiment of the present disclosure, the bezel 3 may form the lateral side S of the electronic device 100. For example, the lateral side S may include a first connecting side S1 to which the first edge 1E1 of the front surface F and the first edge 2E1 of the back surface B are connected. The lateral side S may include a second connecting side S2 to which the second edge 1E2 of the front surface F and the second edge 2E2 of the back surface B are connected. The lateral side S may include a third connecting side S3 to which the third edge 1E3 of the front surface F and the third edge 2E3 of the back surface B are connected. Further, the lateral side S may include a fourth connecting side S4 to which the fourth edge 1E4 of the front surface F and the fourth edge 2E4 of the back surface B are connected.

According to various embodiments of the present disclosure, the bezel 3 may include a first corner connecting side SC1 to which the first corner edge 1C1 of the front surface F and the first corner edge 2C1 of the back surface B are connected. The bezel 3 may include a second corner connecting side SC2 to which the second corner edge 1C2 of the front surface F and the second corner edge 2C2 of the back surface B are connected. The bezel 3 may include a third corner connecting side SC3 to which the third corner edge 1C3 of the front surface F and the third corner edge 2C3 of the back surface B are connected. Further, the bezel 3 may include a fourth corner connecting side SC4 to which the fourth corner edge 1C4 of the front surface F and the fourth corner edge 2C4 of the back surface B are connected.

According to various embodiments of the present disclosure, at least a part of the lateral side S of the bezel 3 may include a curved surface.

According to an embodiment of the present disclosure, the bezel 3 may have a through-hole 3H1 for supporting an ear jack that is equipped to the electronic device 100. An ear plug may be connected to the ear jack through the through-hole 3H1. The through-hole 3H1 may be formed in the first connecting side S1. Alternatively, according to another embodiment of the present disclosure, an Infrared Ray (IR) sensor may also be installed instead of the through-hole 3H1.

According to an embodiment of the present disclosure, the bezel 3 may have a through-hole 3H21 for supporting a socket (connector) that is equipped to the electronic device 100. A plug (connector) may be connected to the socket connector through the through-hole 3H21. The through-hole 3H21 may be formed in the second connecting side S2.

According to an embodiment of the present disclosure, the bezel 3 may have a through-hole 3H22 for supporting a microphone that is equipped to the electronic device 100. An external sound may be input to the microphone through the through-hole 3H22. The through-hole 3H22 may be formed in the second connecting side S2.

According to an embodiment of the present disclosure, the bezel 3 may have a through-hole 3H23 for supporting a speaker that is equipped to the electronic device 100. A sound from the speaker may be sent out through the through-hole 3H23. The through-hole 3H23 may be formed in the second connecting side S2.

According to an embodiment of the present disclosure, the bezel 3 may have a through-hole 3H24 for supporting a stylus pen that is attached to and detached from the electronic device 100. The stylus pen may be inserted into the internal space through the through hole 3H24, or may be separated from the internal space through the through-hole 3H24. The through-hole 3H24 may be formed in the second connecting side S2. Alternatively, according to another embodiment of the present disclosure, the through hole 3H24 may be configured to support an ear jack, and an ear plug may be connected to the ear jack through the through-hole 3H24.

According to an embodiment of the present disclosure, the bezel 3 may have a plurality of through-holes 3H31 and 3H32 for supporting a plurality of key buttons that are equipped to the electronic device 100. The plurality of key buttons may be exposed to the outside of the electronic device 100 through the plurality of through-holes 3H31 and 3H32. The through-holes 3H31 and 3H32 may be formed in the third connecting side S3. Additionally, a through-hole 3H41 for supporting a key button may be formed in the fourth connecting side S4.

According to an embodiment of the present disclosure, the bezel 3 may have a through-hole 3H42 for supporting a memory socket that is equipped to the electronic device 100. A SIM card or a memory may be inserted into the memory socket through the through-hole 3H42. The through-hole 3H42 may be formed in the fourth connecting side S4.

According to various embodiments of the present disclosure, the bezel 3 may have a through-hole 3HC2 for supporting an antenna that is equipped to the electronic device 100. The antenna may be inserted into the internal space through the through hole 3HC2, or may be extracted to the outside through the through-hole 3HC2. The through-hole 3HC2 may be formed in the second corner connecting side SC2.

According to various embodiments of the present disclosure, a detector may be installed around at least one of the above-described through-holes 3H1, 3H21, 3H22, 3H23, 3H24, 3H31, 3H32, 3H41, 3H42, and 3HC2. The detector may be used to detect various external environment factors.

According to various embodiments of the present disclosure, the detector may be shown from the outside through a through-hole.

According to various embodiments of the present disclosure, the detector may change color when a material is brought into contact with the detector. Additionally, the detector may be changed in various colors according to materials.

According to various embodiments of the present disclosure, the detector may also be deformed when a material is brought into contact with the detector.

According to various embodiments of the present disclosure, the detector may be a wet-label or a Liquid Detection Indicator (LDI), and may change color when fluid (e.g., water) is brought into contact with the detector. Therefore, the introduction of fluid can be easily identified through a through-hole.

A detailed description of a structure in which the detector is installed will be described below with reference to drawings, and a mounting structure relating to a wet-label, which is a detector used to detect fluid, will be representatively described.

Figure 3:
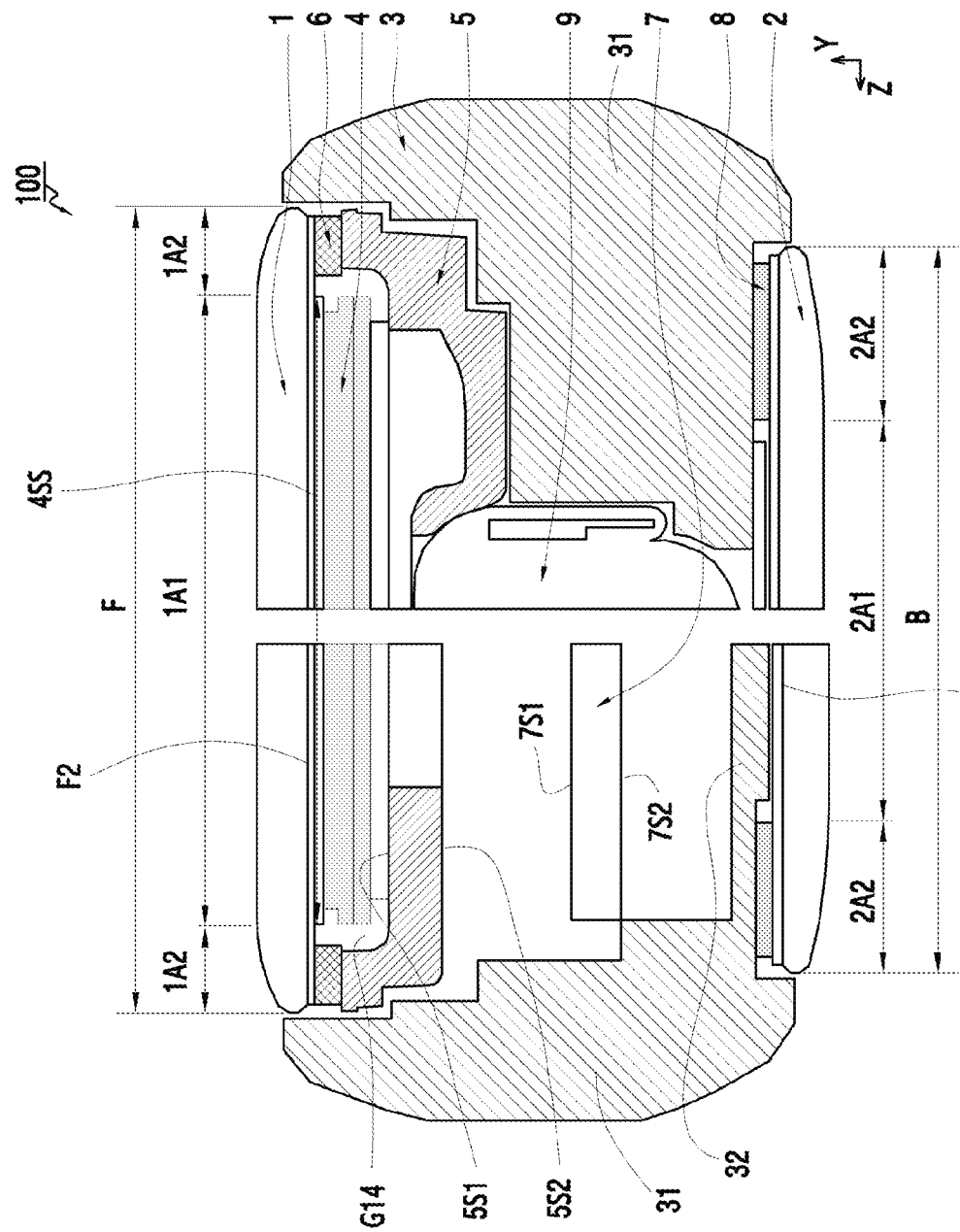
FIG. 3 is a cross-sectional view of the electronic device, according to an embodiment of the present disclosure.
Figure 4:
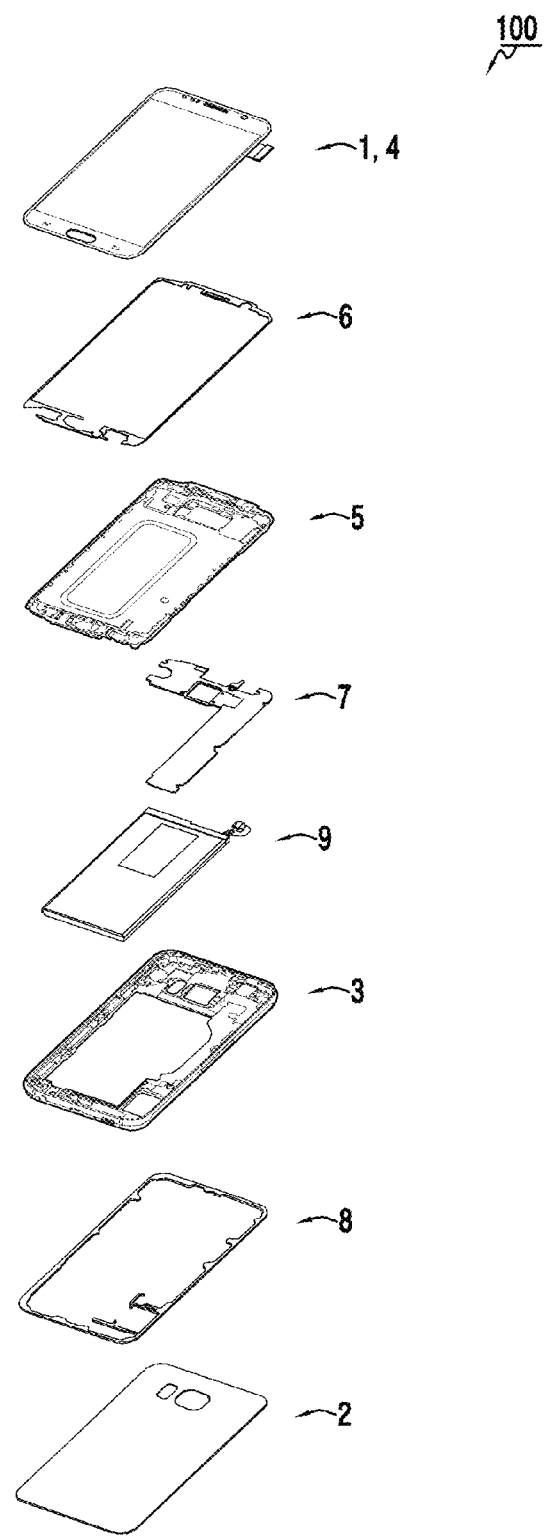
FIGS. 4 and 5 are exploded perspective views of the electronic device when viewed from different directions, according to various embodiments of the present disclosure.
Figure 5:
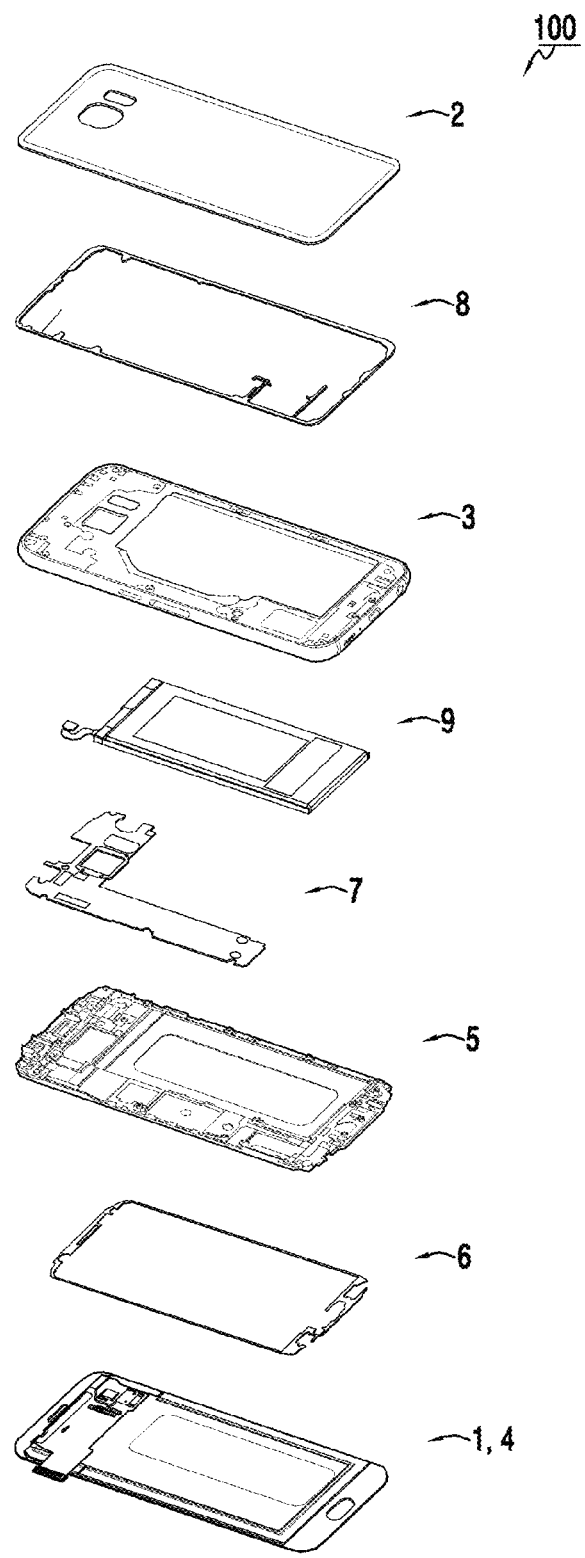
Figure 6A:
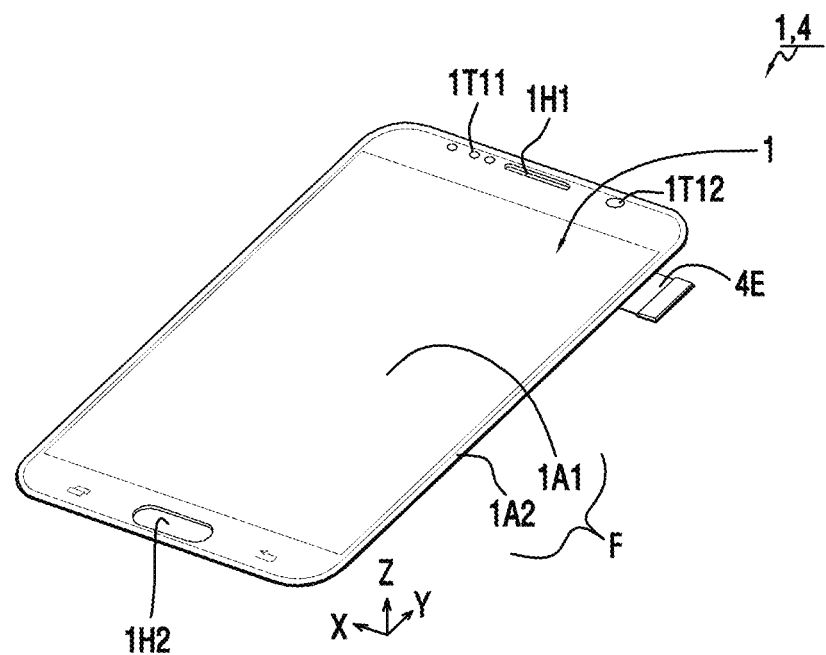
FIG. 6A illustrates a front cover and a display according to an embodiment of the present disclosure.
Figure 6A:
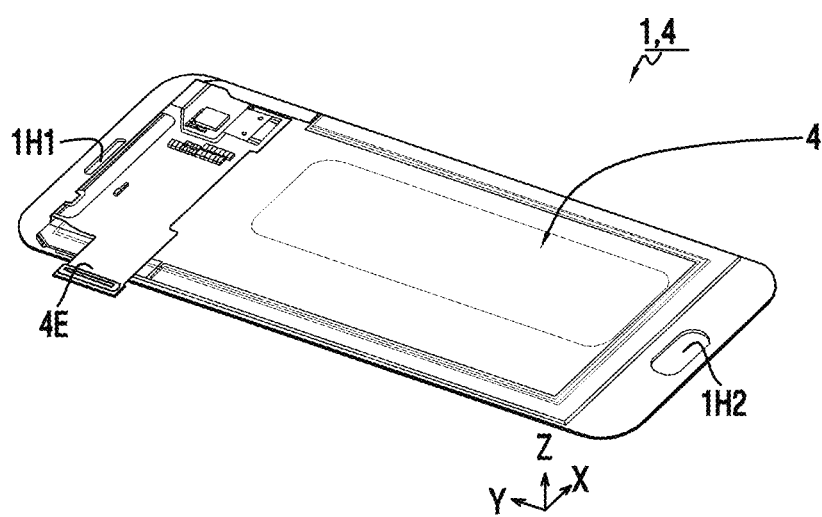
Figure 6B:
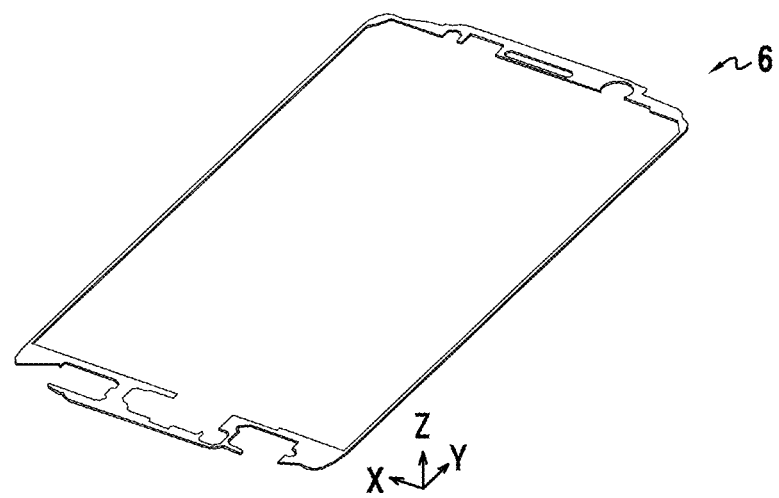
FIG. 6B illustrates a bonding member according to an embodiment of the present disclosure.
Figure 6B:
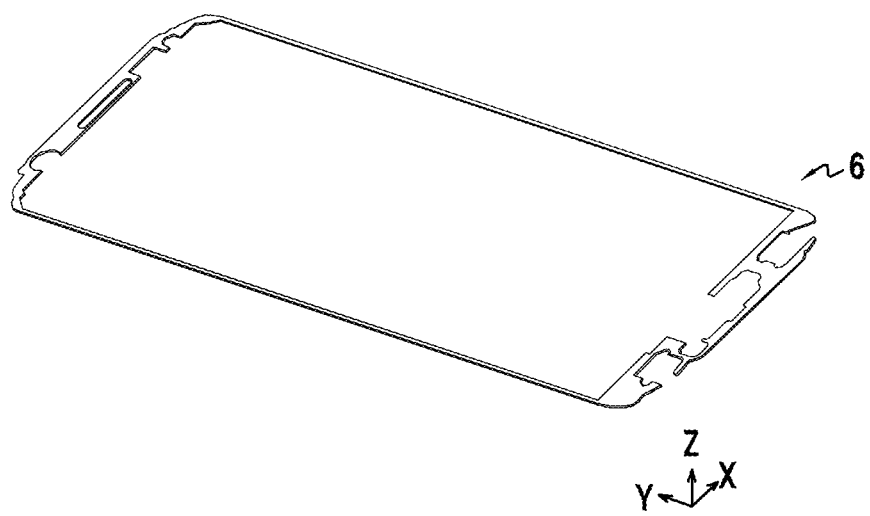
Figure 6C:
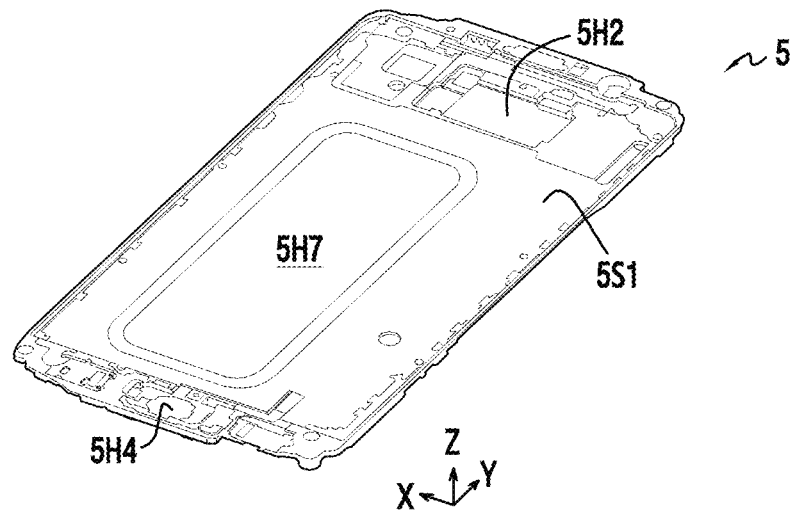
FIG. 6C illustrates a bracket according to an embodiment of the present disclosure.
Figure 6C:
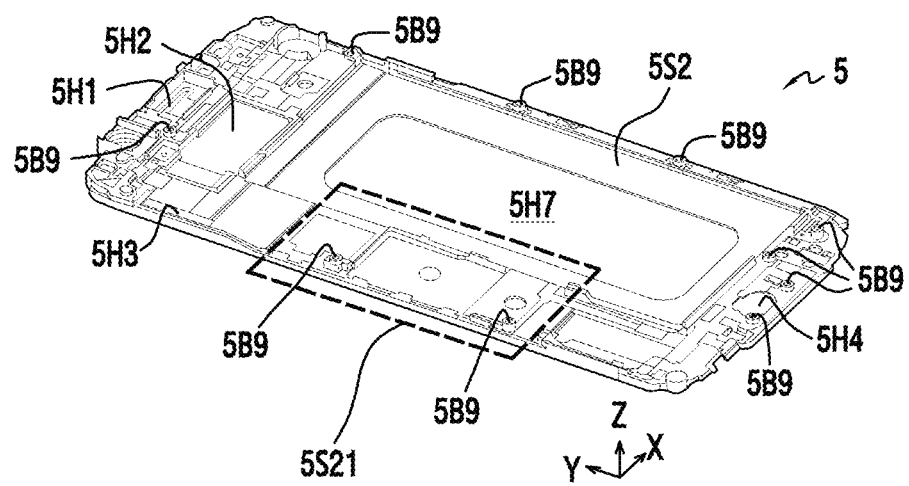
Figure 6D:
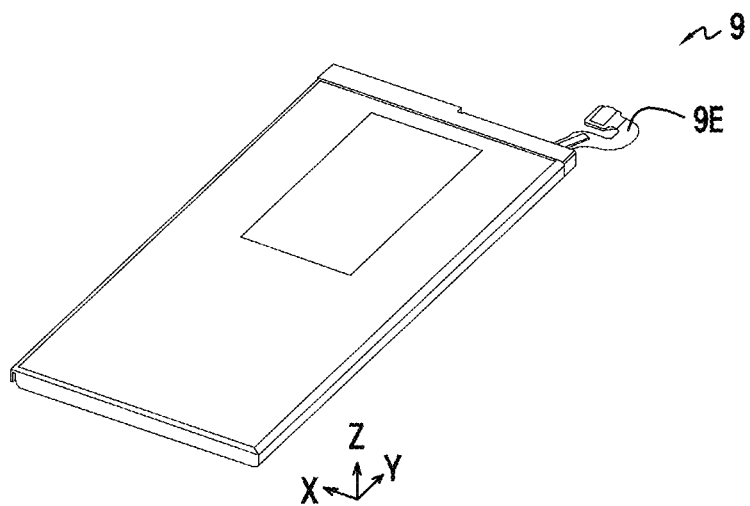
FIG. 6D illustrates a battery according to an embodiment of the present disclosure.
Figure 6D:
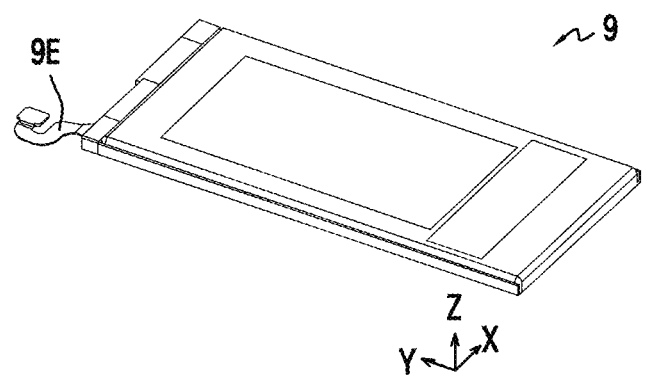
Figure 6E:
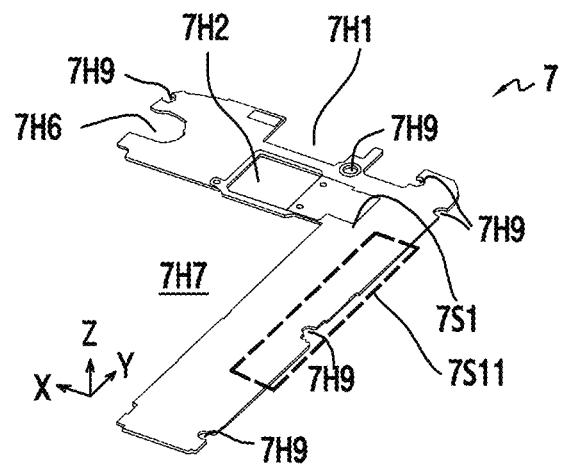
FIG. 6E illustrates a circuit board according to an embodiment of the present disclosure.
Figure 6E:
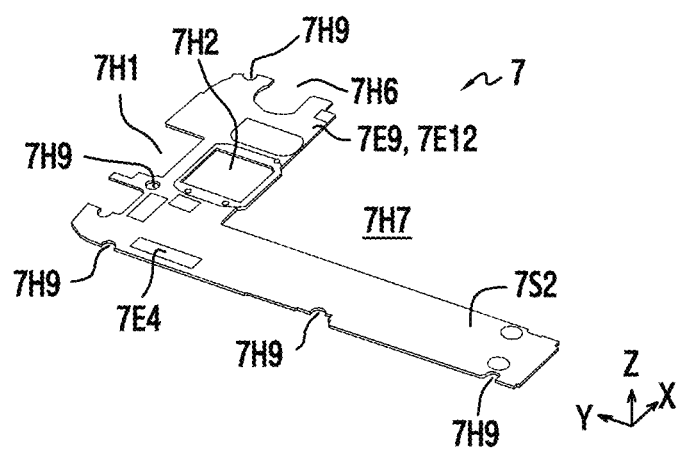
Figure 6F:
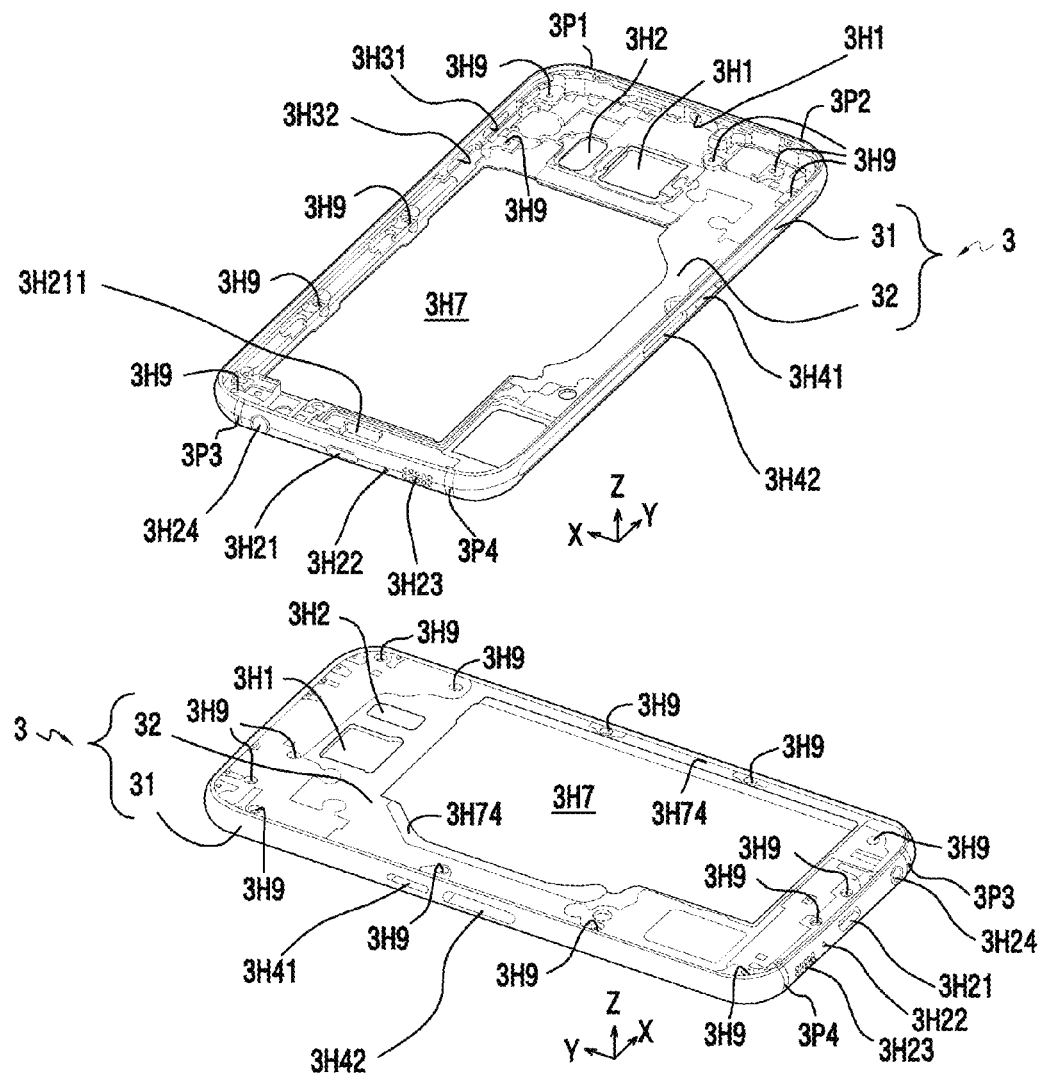
FIG. 6F illustrates a bezel according to an embodiment of the present disclosure.
Figure 6G:
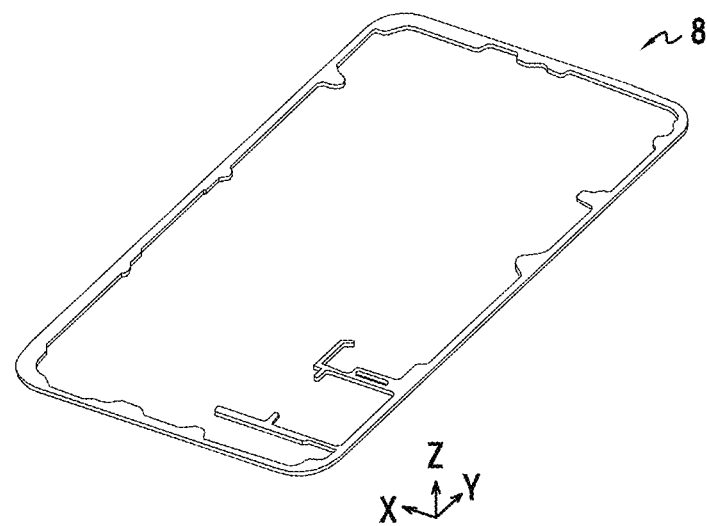
FIG. 6G illustrates a bonding member according to an embodiment of the present disclosure.
Figure 6G:
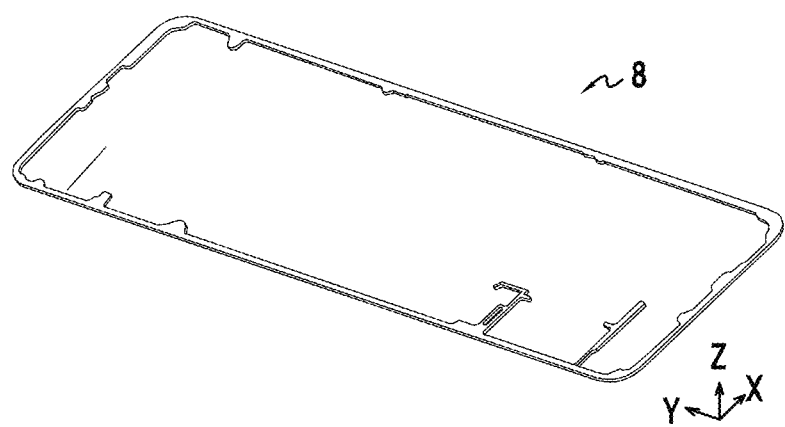
Figure 6H:
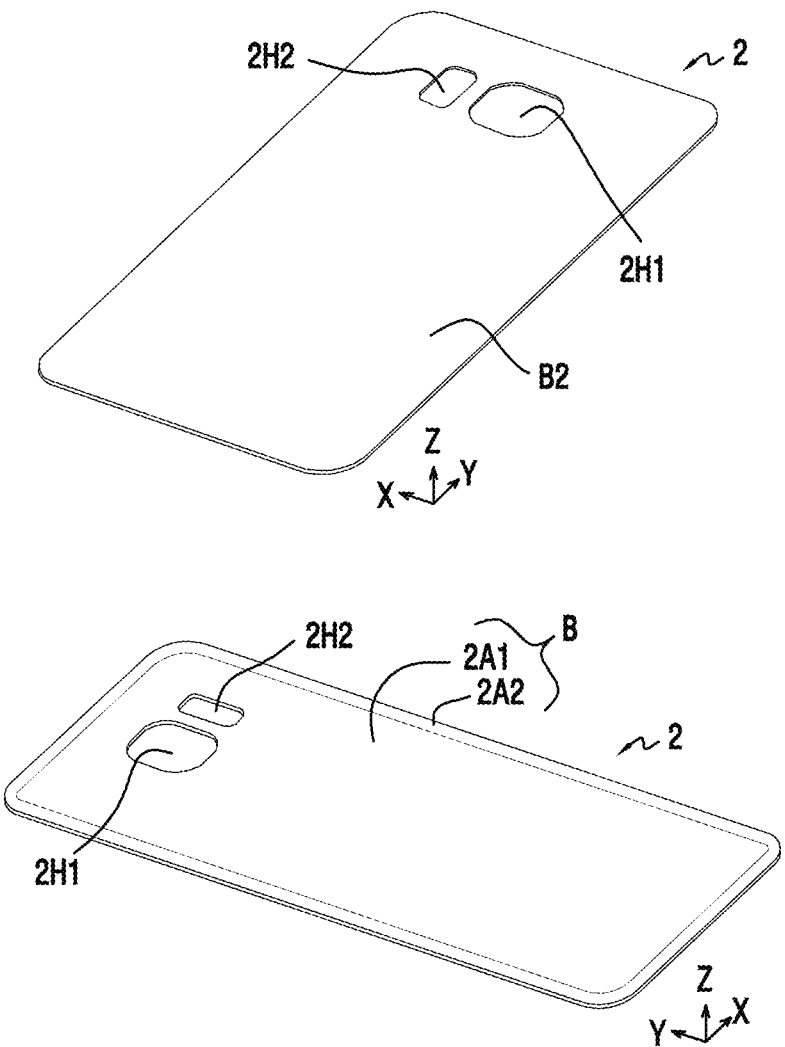
FIG. 6H illustrates a back cover according to an embodiment of the present disclosure.

FIG. 3 is a cross-sectional view of the electronic device, according to an embodiment of the present disclosure. A configuration of a part of the electronic device 100 is provided herein, and such a configuration may not be applied to the whole electronic device 100. FIGS. 4 and 5 are exploded perspective views of the electronic device 100 when viewed from different directions, according to various embodiments of the present disclosure. FIG. 6A illustrates a front cover and a display according to an embodiment of the present disclosure. FIG. 6B illustrates a bonding member according to an embodiment of the present disclosure. FIG. 6C illustrates a bracket according to an embodiment of the present disclosure. FIG. 6D illustrates a battery according to an embodiment of the present disclosure. FIG. 6E illustrates a circuit board according to an embodiment of the present disclosure. FIG. 6F illustrates a bezel according to an embodiment of the present disclosure. FIG. 6G illustrates a bonding member according to an embodiment of the present disclosure. FIG. 6H illustrates a back cover according to an embodiment of the present disclosure.

Referring to FIGS. 3, 4, 5, and 6A, the front cover 1, according to an embodiment of the present disclosure, may substantially have a plate shape and may be disposed on the display 4. The front cover 1 may be transparent and may have an impact resistance.

According to an embodiment of the present disclosure, the front surface F of the front cover 1 may include the central area 1A1 and the edge area 1A2 that surrounds the central area 1A1. Here, the central area 1A1 may be a substantially flat surface. Furthermore, the central area 1A2 may be an inclined surface, for example, a curved surface. The central area 1A1 and the edge area 1A2 may be smoothly connected to each other.

According to an embodiment of the present disclosure, the front cover 1 may include the inner surface F2 that is disposed in the interior of the electronic device 100 and is opposite to the front surface F thereof (i.e., the outer surface exposed to the outside). The inner surface F2 may be a substantially flat surface, but is not limited thereto.

According to an embodiment of the present disclosure, the display 4 may be disposed in a space G14 formed by the front cover 1 and the bracket 5.

According to an embodiment of the present disclosure, the display 4 may include an extension 4E (e.g., a Flexible Printed Circuit Board (FPCB)) on which a connector to be electrically connected to the circuit board 7 is mounted.

According to an embodiment of the present disclosure, the display 4 may include a Liquid Crystal Display (LCD), an Organic Light-Emitting Diode (OLED) (particularly, an Active Matrix (AM) OLED), etc.

According to an embodiment of the present disclosure, the screen area 4SS of the display 4 may be overlaid with the central area 1A1 of the front cover 1 and may not overlap the edge area 1A2.

According to various embodiments of the present disclosure, the display 4 may further include a touch panel. Alternatively, the display 4 may also further include a digitizer panel. A contact or non-contact input on the touch panel or the digitizer panel may be supported through the central area 1A1 of the front cover 1.

According to various embodiments of the present disclosure, the display 4 may also be a display integrated touch screen for receiving a contact input or a non-contact input. For example, the display 4 may be an AM-OLED integrated touch screen (e.g., an On-Cell TSP AMOLED (OCTA)).

According to various embodiments of the present disclosure, the front cover 1 and the display 4 may be provided to a manufacturing process of the electronic device 100, as a single set in which the front cover 1 and the display 4 are coupled to each other.

Referring to FIGS. 3, 4, 5, and 6B, the front cover 1, according to the embodiment of the present disclosure, may be coupled to the bracket 5. For example, the bonding member 6 may be disposed between the surface F2 of the front cover 1 and the bracket 5. Here, the bonding member 6 may be overlaid with the edge area 1A2 of the front cover 1, but may not overlap the central area 1A1 of the front cover 1. The bonding member 6 may have a substantially annular shape.

According to an embodiment of the present disclosure, the bonding member 6 may be a double-sided tape (e.g., a PET double-sided tape), a liquid type adhesive, etc.

According to various embodiments of the present disclosure, the bonding member 6 may be shown to the outside through the front cover 1 and may have a color. For example, the bonding member 6 may have a similar color to the bezel 3. Alternatively, the bonding member 6 may also exhibit a metal texture.

Referring to FIGS. 3, 4, 5, and 6C, the bracket 5, according to the embodiment of the present disclosure, may be disposed between the display 4 and the circuit board 7. The bracket 5, on which electronic components may be mounted, may support one surface 5S1 and the other surface 5S2 that are opposite to each other. The bracket 5 may be a structure disposed to be adjacent to the display 4 and the circuit board 7, where one surface 5S1 of the bracket 5 may serve as a part on which the display 4 is mounted, and the other surface 5S2 of the bracket 5 may serve as a part on which the circuit board 7 is mounted.

According to various embodiments of the present disclosure, one surface 5S1 and the other surface 5S2 of the bracket 5 may have recesses in which the display 4, the circuit board 7, and other devices (e.g., a speaker, a receiver, a vibrator, etc.) are positioned, and the display 4, the circuit board 7, and the other devices may be mounted on the bracket 5 through press-fitting without a clearance therebetween.

According to various embodiments of the present disclosure, the bracket 5 may have a plurality of through-holes 5H1, 5H2, 5H3, and 5H4 into which at least one electronic component is inserted. One or more of the plurality of through-holes 5H1, 5H2, 5H3, and 5H4 may be disposed to correspond to the through-holes 1H1 and 1H2 of the front cover 1. Alternatively, one or more (e.g., 5H3) of the plurality of through-holes 5H1, 5H2, 5H3, and 5H4 may be a portion in which the extension 4E for electrically connecting the display 4 and the circuit board 7 is disposed.

According to various embodiments of the present disclosure, the bracket 5 may provide rigidity to the electronic device 100. Further, the bracket 5 may be used to shield electromagnetic waves or electrical noise, or may be used as a heat dissipation plate for preventing an electronic component from being heated.

According to various embodiments of the present disclosure, the bracket 5 may be formed of metal, such as magnesium (Mg), aluminum (Al), stainless steel (STS), etc. Alternatively, the bracket 5 may also be formed of nonmetal. For example, the bracket 5 may be formed of a high rigidity plastic containing glass fiber. In another case, the bracket 5 may also contain both metal and non-metal (plastic). Additionally, a material for shielding electromagnetic waves may also be applied to the bracket 5.

According to various embodiments of the present disclosure, the bracket 5 may have a perforation 5H7 that corresponds to the battery 9. In cases where the battery 9 swells up, the increased volume of the battery 9 may occupy the space of the perforation 5H7, which prevents the deformation of the battery 9 from having a negative effect on other parts.

According to various embodiments of the present disclosure, the bracket 5 may have an area 5S21 for supporting a socket mounted on the circuit board 7.

Referring to FIGS. 3, 4, 5, and 6E, the circuit board 7, according to the embodiment of the present disclosure, may include a plurality of electronic components mounted on one surface 7S1 and/or the other surface 7S2 thereof and electrical circuits that connect the electronic components. The circuit board 7 may set an execution environment of the electronic device 100, maintain the information, and support data input/output exchange between units in the electronic device 100. The circuit board 7 may be disposed while being coupled to the bracket 5. The circuit board 7 may include a main board, a mother board, a Printed Circuit Board (PCB), or a Printed Board Assembly (PBA).

According to an embodiment of the present disclosure, one surface 7S1 of the circuit board 7 may face one surface 5S2 of the bracket 5, and one surface 5S2 of the bracket 5 may provide a space for accommodating the electronic components (not illustrated) mounted on one surface 7S1 of the circuit board 7. A space may be provided between the other surface 7S2 of the circuit board 7 and the bezel 3, and the electronic components mounted on the other surface 7S2 of the circuit board 7 may be accommodated in the space.

According to various embodiments of the present disclosure, the circuit board 7 may have a space 7H7 that does not overlap the battery 9 disposed between the bracket 5 and the bezel 3. The circuit board 7 may substantially have the shape of '⌐'.

According to various embodiments of the present disclosure, the circuit board 7 may have one or more through-holes 7H1, 7H2, and 7H6 into which at least one electronic component (e.g., a camera, a speaker, or a receiver) is inserted.

According to various embodiments of the present disclosure, the circuit board 7 may include a connector 7E4 mounted on one surface 7S2 thereof. The connector 7E4 may be electrically connected to the connector on the extension 4E of the display 4.

According to various embodiments of the present disclosure, the circuit board 7 may include a plurality of contacts 7E9 mounted on one surface 7S2 thereof, and the plurality of contacts 7E9 may be electrically connected to an extension 9E of the battery 9.

According to various embodiments of the present disclosure, the circuit board 7 may include a plurality of contacts 7E12 mounted on one surface 7S2 thereof, and the plurality of contacts 7E12 may be electrically connected to another non-illustrated device (e.g., an antenna device).

According to various embodiments of the present disclosure, there may be a plurality of electronic components (e.g., an antenna device, an audio device, a power device, a sensor device, etc.) that are not mounted on the circuit board 7. The plurality of electronic components may be mounted on the bracket 5 or the bezel 3. Alternatively, the plurality of electronic components may be installed in the space between the bracket 5 and the bezel 3.

Referring to FIGS. 3, 4, 5, and 6F, the bezel 3, according to the embodiment of the present disclosure, may substantially have the shape of a container that is open in the direction from the back surface B to the front surface F of the electronic device 100, and may be coupled to the bracket 5 to form the whole frame of the electronic device 100. The electronic components (e.g., the display 4, the circuit board 7, etc.) may be mounted on the skeleton structure constituted by the bezel 3 and the bracket 5 to exist within the electronic device 100. The bezel 3 may include a first part 31 that forms the outer surface (e.g., the lateral side S) of the electronic device 100 and a second part 32 that extends from the first part 31 and is disposed between the bracket 5 and the back cover 2. The first part 31 may have a shape that can be engaged with the bracket 5 so that the bracket 5 can be mounted on the bezel 3 without a clearance therebetween. The second part 32 may have a shape that covers one surface 5S2 of the bracket 5, and the inner surface of the second part may be smooth as illustrated in the drawings, but may have various concave-convex patterns without being limited thereto. For example, at least one rib extending toward the bracket 5 may be located on the inner surface of the second part 32 to support the bracket 5. Further, at least one rib extending toward circuit board 7 may be located on the inner surface of the second part 32 to support the circuit board 7.

According to various embodiments of the present disclosure, the second part 32 of the bezel 3 may have one or more through-holes 3H1 and 3H2 into which at least one electronic component (e.g., a memory socket, a camera, a flash, etc.) mounted on one surface 7S2 of the circuit board 7 may be inserted. The one or more through-holes 3H1 and 3H2 may be formed to correspond to the through-holes 2H1 and 2H2 of the back cover 2.

According to various embodiments of the present disclosure, the bracket 3 may have a perforation 3H7 that corresponds to the battery 9. In cases where the battery 9 swells up, the increased volume of the battery 9 may occupy the space of the perforation 3H7, which prevents the deformation of the battery 9 from having a negative effect on other parts.

According to various embodiments of the present disclosure, the bezel 3 may include a plurality of segments 3P1, 3P2, 3P3, and 3P4. The bezel 3 may include a plurality of segment sections distinguished by the plurality of segments 3P1, 3P2, 3P3, and 3P4. In cases where the bezel 3 is formed of metal, the structure of the bezel 3 constituted by the plurality of segment sections may prevent the performance of an antenna mounted in the electronic device 100 from being degraded.

According to various embodiments of the present disclosure, the bezel 3 may contain a conductive material and may be electrically connected to the ground surface of the circuit board 7. For example, a conductive material may be applied to the inner surface of the second part 32 of the bezel 3. The electrical connection between the conductive material of the bezel 3 and the ground surface of the circuit board 7 may be caused by bringing the rib of the second part 32 into contact with the ground surface of the circuit board 7. Here, the rib of the second part 32 may include a conductive rubber gasket that is brought into resilient contact with the ground surface of the circuit board 7.

According to various embodiments of the present disclosure, the bezel 3 may further include an additional member formed of a metal, a composite material, etc. The additional member may improve the rigidity of the bezel 3. The additional member may be installed in the above-described available space.

According to various embodiments of the present disclosure, the bezel 3 may further include an auxiliary device for improving a thermal characteristic, an antenna characteristic, etc.

Referring to FIGS. 3, 4, 5, 6C, 6E, and 6F, the bezel 3, the circuit board 7, and the bracket 5 may be coupled to each other according to various embodiments of the present disclosure. For example, the bezel 3 may have a plurality of bolt holes 3H9 for bolt fastening. The circuit board 7 may have a plurality of bolt holes 7H9 for bolt fastening. Further, the bracket 5 may have a plurality of bosses 5B9 for bolt fastening. A plurality of bolts may pass through the plurality of bolt holes 7H9 of the circuit board 7 after being inserted into the plurality of bolts holes 3H9 of the bezel 3, and may thereafter be secured to the plurality of bosses 5B9 of the bracket 5 so that the bezel 3, the circuit board 7, and the bracket 5 can be coupled to each other.

Referring to FIGS. 3, 4, 5, and 6H, the back cover 2, according to the embodiment of the present disclosure, may substantially have a plate shape that can be coupled to the second part 32 of the bezel 3, and may form the back surface B of the electronic device 100. For example, the second part 32 of the bezel 3 may have a recess in which the back cover 2 is positioned, and the back cover 2 may be coupled to the second part 32 of the bezel 3 through press-fitting without a clearance therebetween.

According to an embodiment of the present disclosure, the back surface B of the back cover 2 may include the central area 2A1 and the edge area 2A2 that surrounds the central area 2A1. Here, the central area 2A1 may be a substantially flat surface. Furthermore, the edge area 2A2 may be an inclined surface, for example, a curved surface. The central area 2A1 and the edge area 2A2 may be smoothly connected to each other.

According to an embodiment of the present disclosure, the back cover 2 may include the inner surface B2 that is disposed in the interior of the electronic device 100 and is opposite to the back surface B (i.e., the outer surface exposed to the outside). The inner surface B2 may be a substantially flat surface, but is not limited thereto. For example, the inner surface B2 may also have a shape that corresponds to the second part 32 of the bezel 3.

Referring to FIGS. 3, 4, 5, and 6G, according to an embodiment of the present disclosure, the bonding member 8 may be disposed between the inner surface B2 of the back cover 2 and the bezel 3. Here, the bonding member 8 may overlap the first area 2A1, the second area 2A2, the third area 2A3, and the fourth area 2A4 of the back cover 2, but may not overlap the central area 2A of the back cover 2. The bonding member 8 may have a substantially annular shape.

According to various embodiments of the present disclosure, the bonding member 8 may be a double-sided tape (e.g., a PET double-sided tape), a liquid type adhesive, etc.

Referring to FIGS. 3, 4, 5, 6C, 6D, and 6F, according to an embodiment of the present disclosure, the battery 9 that supplies electric power to the electronic device 100 may substantially have a plate shape and may be disposed between the bracket 5 and the bezel 3. In particular, the battery 9 may be disposed between the perforation 5H7 of the bracket 5 and the perforation 3H7 of the bezel 3. One surface 9S1 of the battery 9 may face the display 4 through the perforation 5H7 of the bracket 5, and the other surface 9S2 of the battery 9 may face a non-illustrated antenna device through the perforation 3H7 of the bezel 3. As described above, the perforation 5H7 of the bracket 5 and the perforation 3H7 of the bezel 3 may prevent deformation and damage to the surroundings that may be caused by the swelling of the battery 9.

According to various embodiments of the present disclosure, one end 9E of the battery 9 may include a contact, and the contact may be electrically connected to the contact 7E9 of the circuit board 7.

Structures Accommodated in the External Housing

Structures that are accommodated in a space in the external housing shall in accordance with certain embodiments shall now be described.

Figure 7:
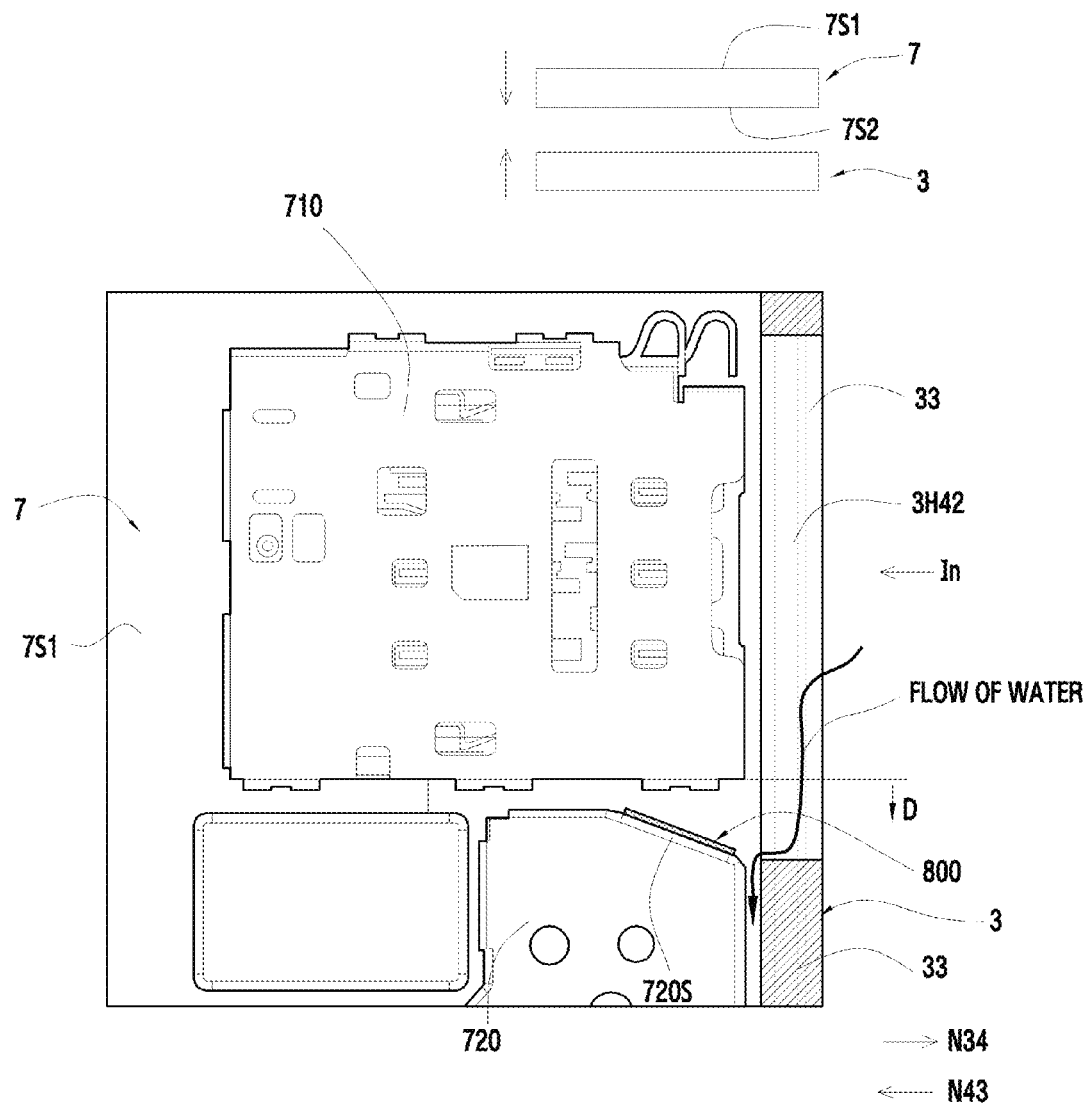
FIG. 7, FIG. 8 and FIG. 9 are perspective views illustrating a state in which the circuit board and the bezel are coupled to each other when viewed from various directions, according to an embodiment of the present disclosure.
Figure 8:
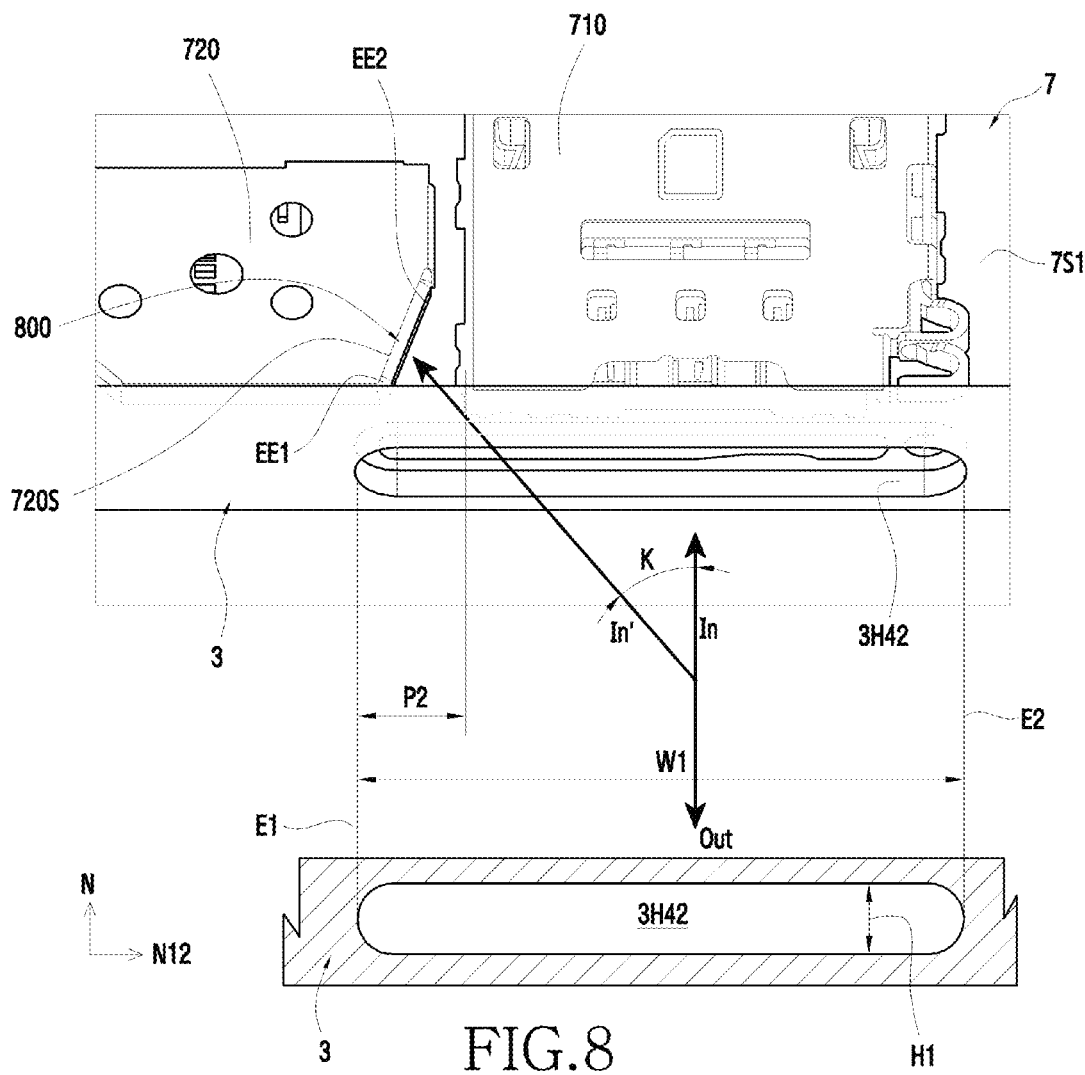
Figure 9:
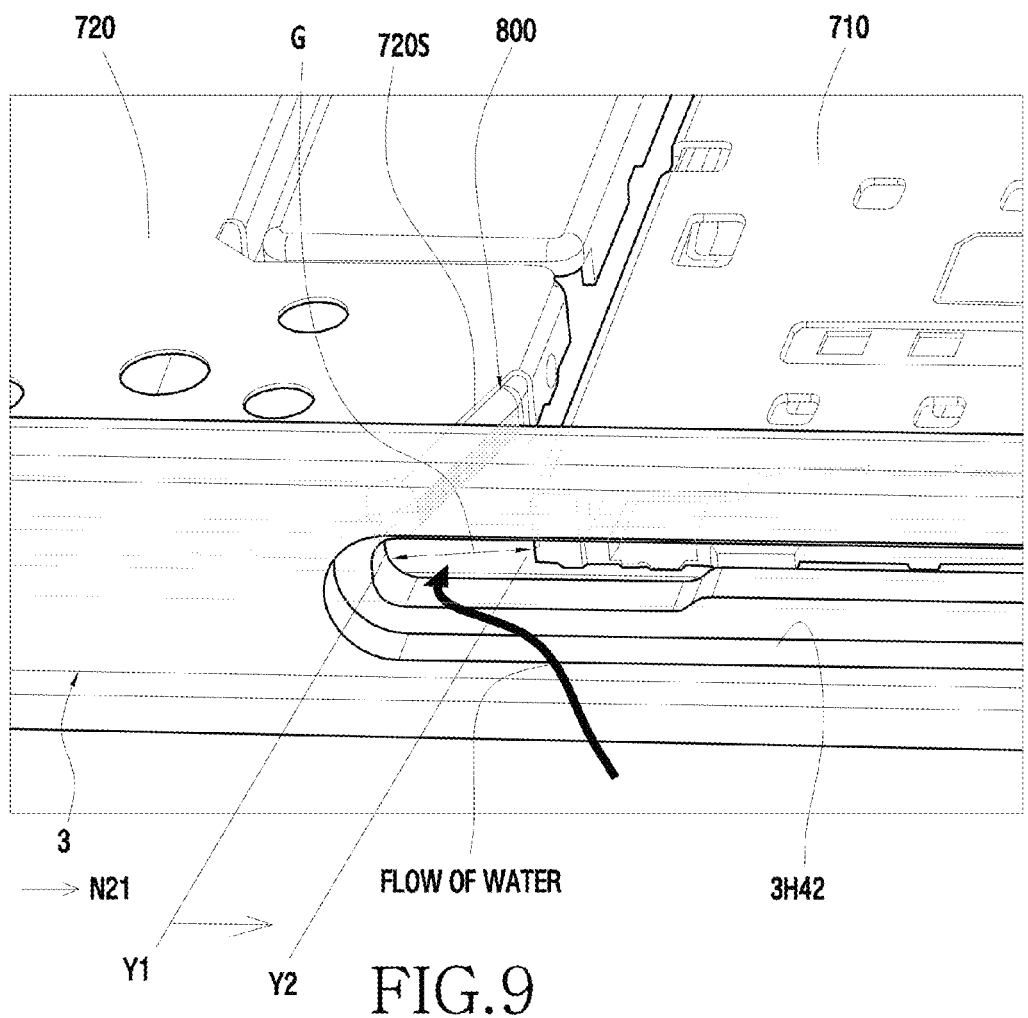
Figure 10:
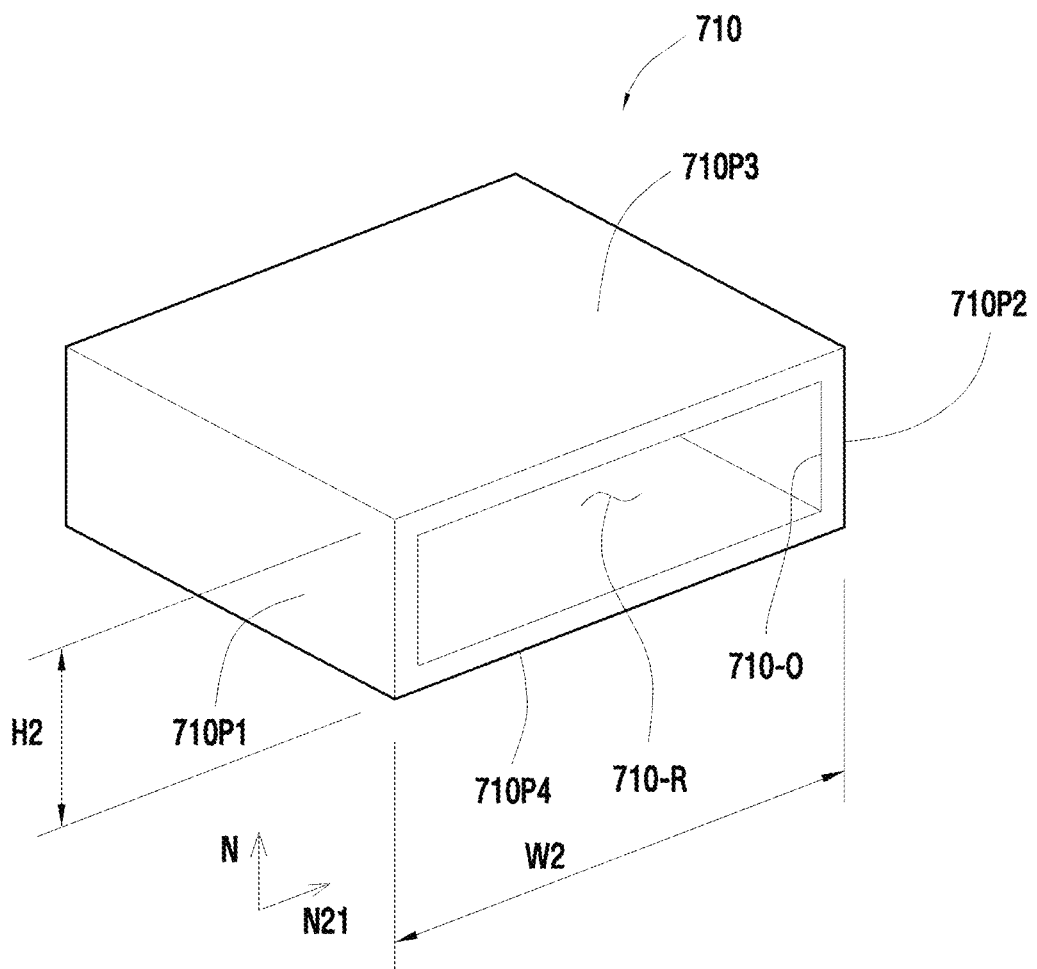
FIG. 10 illustrates a memory socket according to an embodiment of the present disclosure.
Figure 11:
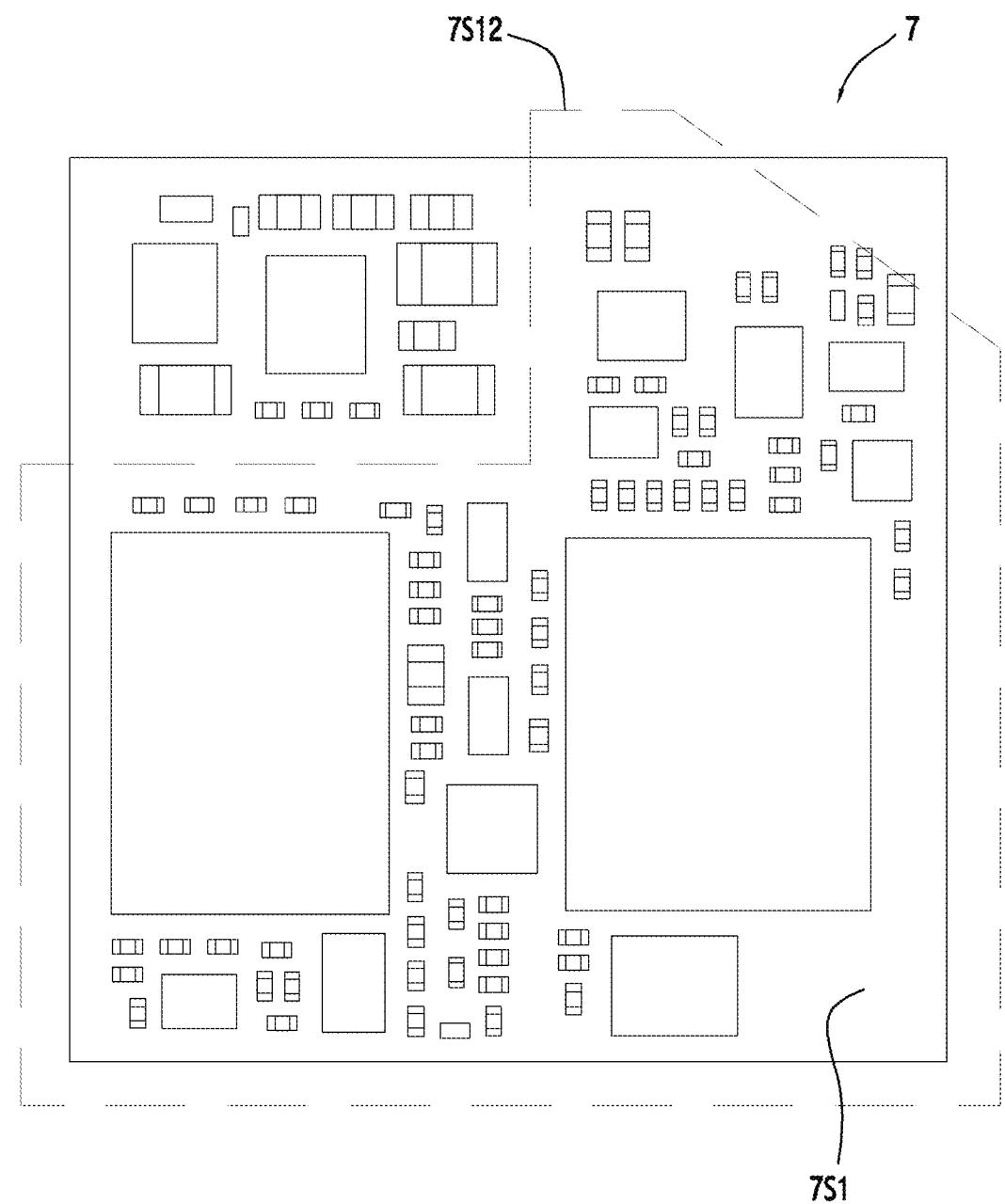
FIG. 11 illustrates a circuit board according to an embodiment of the present disclosure.
Figure 12:
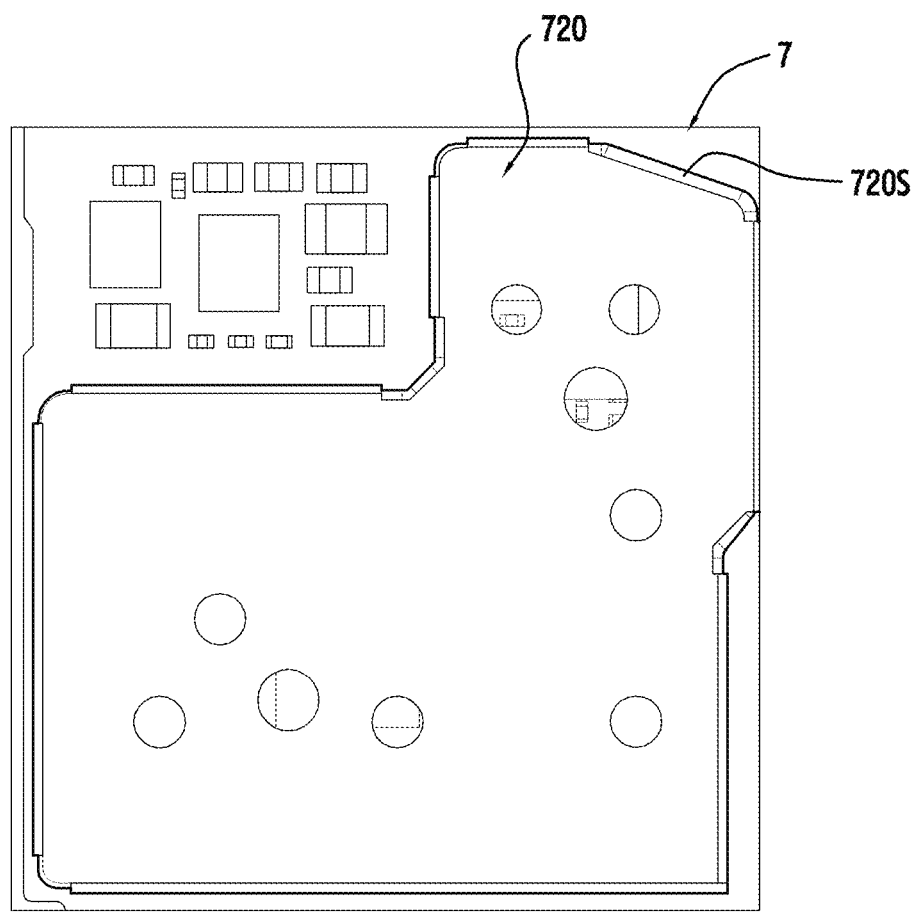
FIG. 12 illustrates a structure according to an embodiment of the present disclosure.
Figure 13:
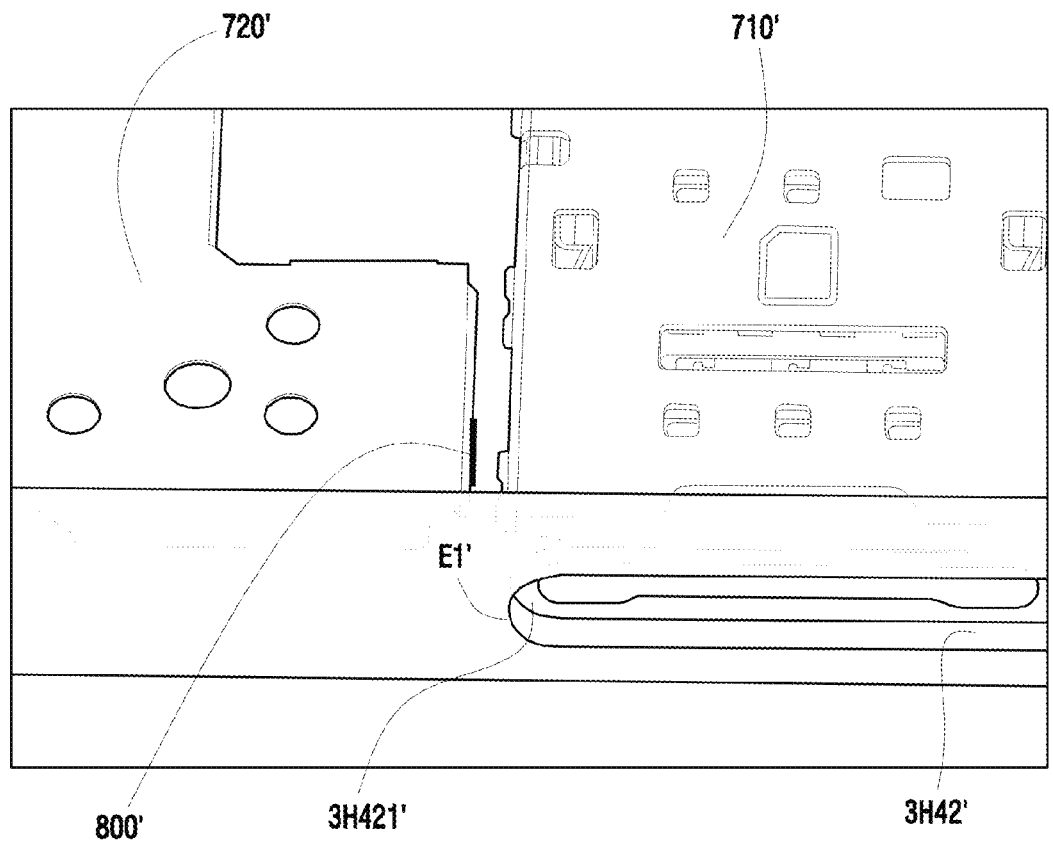
FIG. 13 illustrates an example of a general state in which a circuit board and a bezel are coupled to each other.

FIGS. 7 to 9 are perspective views illustrating a state in which the circuit board and the bezel are coupled to each other, when viewed from various directions, according to an embodiment of the present disclosure. FIG. 10 illustrates a memory socket according to an embodiment of the present disclosure. FIG. 11 illustrates a circuit board according to an embodiment of the present disclosure. FIG. 12 illustrates a structure according to an embodiment of the present disclosure. FIG. 13 illustrates an example of a general state in which a circuit board and a bezel are coupled to each other.

Referring to FIGS. 7 to 9, the circuit board 7 may be mounted on the second part (32 of FIG. 6F) of the bezel 3. Further, the circuit board 7 may be disposed to be surrounded by the first part 31 of the bezel 3. For example, the bezel 3 may have a substantially similar structure to a container, and the circuit board 7 may be disposed in such a manner as to be installed on the bottom of the structure. Accordingly, the circuit board 7 may be hidden by the first part 31 when viewed in the direction from the fourth connecting side S4 to the third connecting side S3 of the electronic device 100.

According to an embodiment of the present disclosure, the circuit board 7 may have component-mounting surfaces 7S1 and 7S2 that are opposite to each other, and a plurality of electronic components may be mounted on the component-mounting surfaces 7S1 and 7S2. The component-mounting surface 7S2 of the circuit board 7 may face the bezel 3, and the plurality of electronic components mounted on the component-mounting surface 7S2 may be disposed in the space between the component-mounting surface 7S2 of the circuit board 7 and the bezel 3.

According to an embodiment of the present disclosure, a socket 710 and a structure 720S adjacent to the socket 710 may be mounted on the other component-mounting surface 7S1 of the circuit board 7. The structure 720S may have a portion comprising mounting surface 720S and wet-label 800 directed towards the through-hole 3H21 or 3H42. The wet-label mounting surface 720S/800 may be a flat surface, wherein the plane of the flat surface forms an acute angle with the direction of the passage 710R. Alternatively, the wet-label mounting surface 720S/800 may be curved.

First Structure

In certain embodiments, a first structure comprising socket 710 can be accommodated in the space of the external housing. The socket can have an opening adjacent to a through-hole in the external housing and a passage wherein the passage extends in a first direction.

Referring to FIG. 10, the socket 710 is a structure with a passage 710-R and may have an opening 710-O that is an inlet of the passage 710-R. In certain embodiments, the opening 710-O is disposed adjacent to a through-hole in the external housing, such as through-hole in the bezel 3H21. The passage 710-R can extend in a first direction.

According to an embodiment, the socket 710 may have a substantially similar shape to a rectangular cylinder. For example, the socket 710 may have a structure in which four plates 710P1, 710P2, 710P3, and 710P4 are connected in a ring shape, and may have the rectangular passage 710-R and the rectangular opening 710-0 that is an inlet of the rectangular passage 710-R.

According to an embodiment of the present disclosure, the opening 710-0 of the socket 710 may have a shape in which a second width W2 formed in the direction N21 from the second connecting side S2 to the first connecting side S1 of the electronic device 100 is larger than a first width H2 formed in the direction N from the back surface B to the front surface F of the electronic device 100.

According to an embodiment of the present disclosure, the socket 710 may be used for mounting a storage memory, such as a SIM card, a USIM card, or an SD memory. The card may be inserted into the passage 710-R through the opening 710-0.

According to an embodiment of the present disclosure, the socket 710 may include a plurality of contacts (not illustrated) disposed in the passage 710-R. The contacts may be used for an electrical connection to the card.

According to an embodiment of the present disclosure, a plurality of leads may be disposed on one surface (e.g., the fourth plate 710P4) of the socket 710. The plurality of leads may be coupled to a plurality of lands or pads disposed in a socket mounting area 7S11 of the circuit board 7 through soldering, and the socket 710 may be accordingly coupled to the circuit board 7. The plurality of leads may be electrically connected to the plurality of contacts disposed in the passage 710-R and may function to electrically connect the card inserted into the passage 710-R to the circuit board 7.

According to an embodiment of the present disclosure, the socket 710 may be mounted on an edge of the circuit board 7 (e.g., the socket mounting area 7S11 of FIG. 6E) so as to be disposed adjacent to the first part 31 of the bezel 3 that forms the lateral side S of the electronic device 100. In particular, the opening 710-0 of the socket 710 may be disposed adjacent to the through-hole 3H42 of the bezel 3 such that a card may be smoothly inserted into the passage 710-R of the socket 710 through the through-hole 3H42 of the bezel 3.

According to various embodiments of the present disclosure, the circuit board 7 may further include a structure 720 that is disposed on the component-mounting surface 7S1, on which the socket 710 is mounted, and is adjacent to the socket 710.

In certain embodiments, the front cover 1, the back cover 2, bezel 3 can form an external housing. A through-hole, such as through-hole 3H21 or 3H42, in the bezel 3 can connect the inside of the external housing to the outside of the external housing. A first structure, such as socket 710 can be accommodated in the external housing. The socket 710 can include a passage 710-R extending in a first direction and an opening 710-O, wherein the opening is connected to the through-hole 3H21, 3H42. In certain embodiments, first structure can comprise an audio device that discharges a sound to the outside of the external housing through the passage 710-R or introduces a sound into the external housing through the passage 710-R, or In certain embodiments, the first structure can comprise an optical device that sends light to the outside of the external housing through the passage 710-R or introduces light into the external housing through the passage 710-R Second Structure In certain embodiments, a second structure comprising structure 720 can be accommodated in the space of the external housing and disposed adjacent to the first structure, e.g., socket. Structure 720 can have a portion comprising mounting surface 720S and wet-label 800 directed towards the through-hole 3H21 or 3H42. The wet-label mounting surface 720S/800 may be a flat surface, wherein the plane of the flat surface forms an acute angle with the direction of the passage 710R. Alternatively, the wet-label mounting surface 720S/800 may be curved.

Referring to FIGS. 11 and 12, the structure 720 may cover a preset area 7S12 of the component-mounting surface 7S1 of the circuit board 7. According to an embodiment of the present disclosure, the structure 720 may be formed of a metal material and may be implemented as a grounding body of the electronic device 100. The structure 720 may function to reduce electrical noise (e.g., a shield can).

According to various embodiments of the present disclosure, the structure 720 may also support a function for improving the performance of an antenna. In addition, the structure 720 may be electrically connected to the circuit board 7 to support various functions.

According to various embodiments of the present disclosure, the structure 720 may function to protect and support an electronic component. For example, the structure 720 may be used as a housing that surrounds a component, such as an image sensor, etc. The structure 720 may be formed of a non-metal material or a metal material.

According to various embodiments of the present disclosure, the structure 720 may correspond to a part of an element equipped to the electronic device 100. For example, the structure 720 may have a structural shape that corresponds to a part of the bezel 3 or the bracket 5.

According to an embodiment of the present disclosure, the bezel 3 may include a third part 33 that has the through-hole 3H42, and the third part 33 may substantially have the shape of a straight line. Likewise to the third part 33, the through-hole 3H42 may have the shape of a straight line.

According to an embodiment of the present disclosure, the through-hole 3H42 may have a shape in which a width W1 formed in the direction N12 from the first connecting side S1 to the second connecting side S2 of the electronic device 100 is larger than a first height H1 formed in the direction N from the back surface B to the front surface F of the electronic device 100. Here, the height H1 of the through-hole 3H42 may be equal to or larger than the first height H1 of the opening 710-0 of the socket 710. In particular, the width W1 of the through-hole 3H42 may be larger than the second width W2 of the opening 710-0.

Particularly, the through-hole 3H42 may include an extension P2 that further protrudes beyond the opening 710-0 of the socket 710 in the direction from the first connecting side S1 to the second connecting side S2 of the electronic device 100.

According to various embodiments of the present disclosure, a wet-label 800 may be mounted to be shown from the outside of the electronic device 100 through the extension P2 of the through-hole 3H42. In particular, the wet-label 800 may be coupled to the structure 720 adjacent to the socket 710.

According to an embodiment of the present disclosure, the structure 720 may provide a wet-label mounting surface 720S to which the wet-label 800 is to be attached. The wet-label 800, when being mounted on the wet-label mounting surface 720S, may be shown through the through-hole 3H42 of the bezel 3 as described above.

According to various embodiments of the present disclosure, the mounting surface 720S itself may contain a material that changes color when being brought into contact with water, instead of the structure in which the wet-label 800 is attached to the wet-label mounting surface 720S.

According to various embodiments of the present disclosure, the wet-label 800 is not necessarily mounted on the whole area of the wet-label mounting surface 720S, and the arrangement and/or size thereof may be adjusted on the wet-label mounting surface 720S. Further, the wet-label 720S may be substantially attached to the wet-label mounting surface 720S in the shape of a film and may also represent the shape of the wet-label mounting surface 720S as it is.

According to an embodiment of the present disclosure, the wet-label mounting surface 720S may be disposed at the same height as the through-hole 3H42 of the bezel 3 in the direction from the back surface B to the front surface F of the electronic device 100.

According to an embodiment of the present disclosure, the wet-label mounting surface 720S may be adjacent to the component mounting surface 7S1 of the circuit board 7.

According to an embodiment of the present disclosure, the wet-label mounting surface 720S may extend from a point EE1 around one end E1 of the extension P2 of the through-hole 3H42.

According to various embodiments of the present disclosure, the wet-label mounting surface 720S may gradually increase in size from one end E1 toward the other end E2 of the through-hole 3H42 in the direction (In) in which a card is inserted. The wet-label mounting surface 720S may be a flat surface, or a curved surface although not illustrated.

According to various embodiments of the present disclosure, the wet-label mounting surface 720S may extend so as to be closer to the socket 710 along the card insertion direction (In). In other words, the distance D between the wet-label mounting surface 720S and the socket 710 may gradually decrease along the card insertion direction (In). In contrast, the distance D between the wet-label mounting surface 720S and the socket 710 may gradually increase along the direction (Out) in which the card is separated.

According to various embodiments of the present disclosure, the other end EE2 of the wet-label mounting surface 720S may be close to, but may not be brought into contact with, the socket 710.

According to various embodiments of the present disclosure, the wet-label mounting surface 720S may be a flat surface, and the direction (In') of the wet-label mounting surface may be neither parallel to the card insertion direction (In), nor perpendicular thereto (angle K=acute angle).

According to an embodiment of the present disclosure, the wet-label mounting surface 720S may be substantially shown through the space between one end E1 of the through-hole 3H42 and one end G of the opening 710-0, namely, through the extension P2.

Referring to a general configuration illustrated in FIG. 13, a wet-label 800' may be mounted on one surface of a structure 720' that is adjacent to a socket 710' and a through-hole 3H42'. However, unlike the through-hole 3H42 of the present disclosure, the through-hole 3H42' does not have an extension that further extends beyond an opening of the socket 710' so that it is difficult to ensure visibility for observing the wet-label 800'. Even though the extension P2, according to the embodiment of the present disclosure, is assumed to be configured, it is difficult to view the wet-label 800' because the surface on which the wet-label 800' is mounted is not exposed toward the through-hole 3H42'.

Further, referring to the general configuration illustrated in FIG. 13, since the wet-label 800' is adjacent to one end E1' of the through-hole 3H42', even though a small amount of water collects in the end E1', the water may make contact with the wet-label 800'. Also, since the wet-label 800' is adjacent to the socket 710', a small amount of water that flows out of the socket 710' may make contact with the wet-label 800'. The wet-label 800' may change color even by a small amount of water that may not cause a malfunction of the electronic device 100 so that the state of the electronic device 100 may be misconceived.

In contrast, according to an embodiment of the present disclosure, the location and size of the wet-label 800 may be adjusted on the wet-label mounting surface 720S. In particular, the wet-label 800 may be designed to be spaced apart from the through-hole 3H42. Here, since the wet-label 800 is separated from the end E1 of the extension P2, water existing in the end E1 of the extension P2 may not make contact with the wet-label 800. Water collected in the socket 710 may be discharged from the socket 710 when the electronic device 100 is tilted, or when impact is applied to the electronic device 100. However, according to an embodiment of the present disclosure, the wet-label 800 may be designed to be spaced apart from the socket 710 on the wet-label mounting surface 720S so that the water discharged from the socket 710 may not make contact with the wet-label 800.

Figure 14:
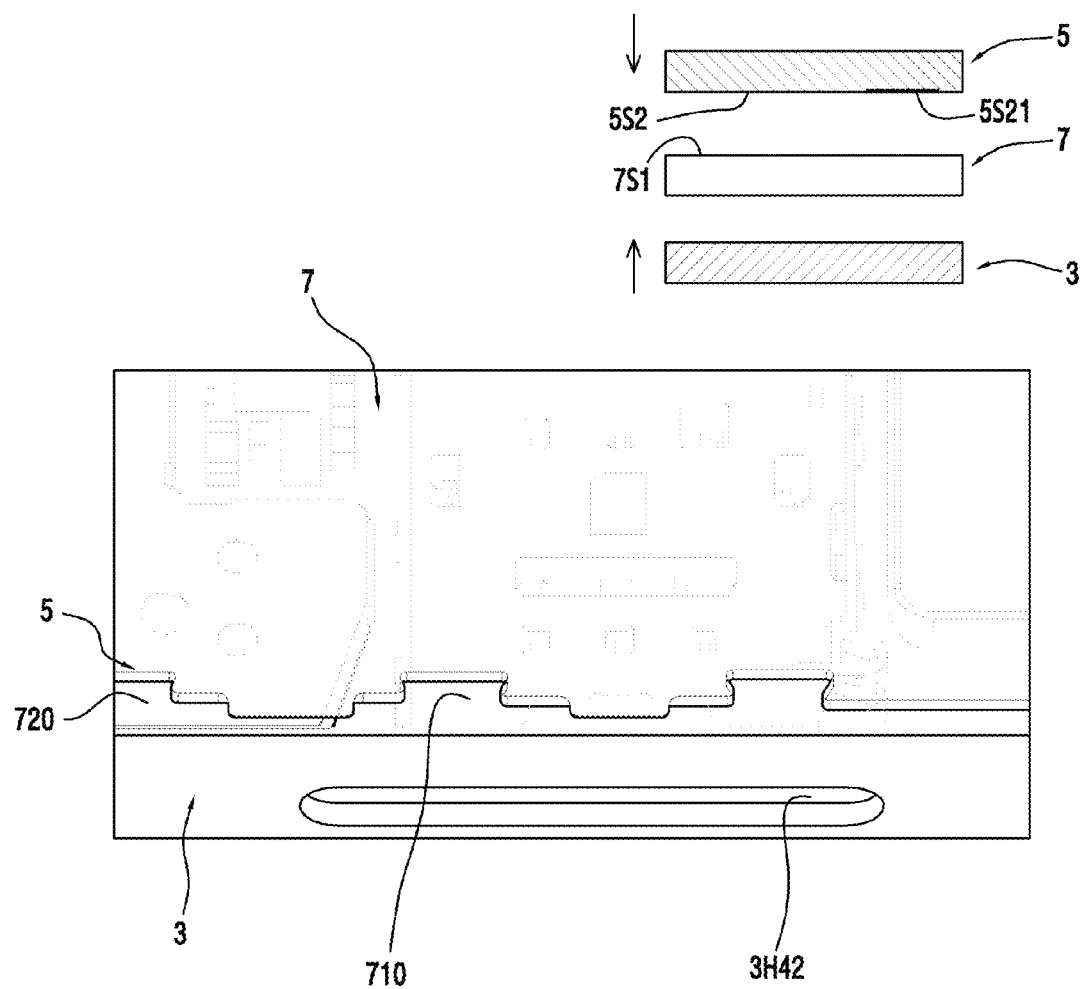
FIG. 14 illustrates a state in which the circuit board, the bracket, and the bezel are coupled to each other, according to an embodiment of the present disclosure.

FIG. 14 illustrates a state in which the circuit board, the bracket, and the bezel are coupled to each other, according to an embodiment of the present disclosure.

Referring to FIG. 14, the circuit board 7 may be disposed between the bracket 5 and the bezel 3. The surface 5S2 of the bracket 5 may cover the circuit board 7. Further, the socket support area 5S21 (referring to FIG. 6C) formed on the surface 5S2 of the bracket 5 may support the socket 710 mounted on the surface 7S1 of the circuit board 7. Here, a passage that connects the through hole 3H42 and the empty space between the circuit board 7 and the bracket 5 may help confine a path into which water flows.

Figure 15:
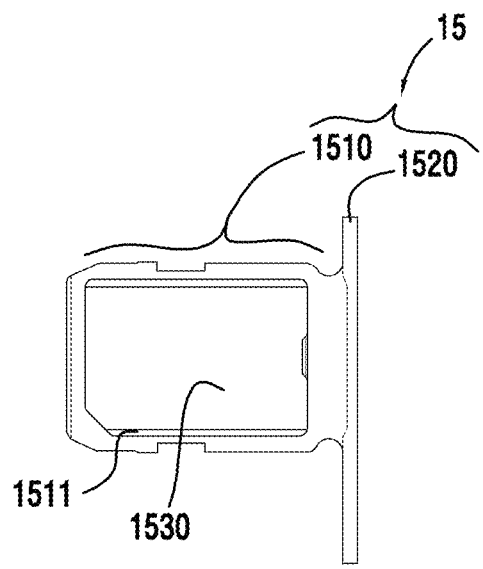
FIG. 15 illustrates a card tray according to an embodiment of the present disclosure.

FIG. 15 illustrates a card tray according to an embodiment of the present disclosure.

Referring to FIG. 15, the card tray 1500 may be press-fit into a structure constituted by the socket 710 and a through-hole 4H42 of the bezel 3.

According to an embodiment of the present disclosure, the card tray 1500 may include a card arrangement part 1510 and a cover part 1520. The card arrangement part 1510 may have a plate shape, and a card 1530 may be coupled to the card arrangement part 1510. For example, the card 1530 may be installed in a recess 1511 formed in the card arrangement part 1510. The card 1530 may include a storage memory, such as a SIM card, a USIM card, or an SD memory.

According to an embodiment of the present disclosure, the cover part 1520 may be connected to a side of the card arrangement part 1510 and may have protrusions that protrude from opposite sides thereof.

According to an embodiment of the present disclosure, in cases where the card tray 1500 on which the card 1530 is mounted is inserted into the structure constituted by the socket 710 and the through-hole 4H42 of the bezel 3, the card arrangement part 1510 may be inserted into the passage 710-R, and contacts (not illustrated) of the card 1530 may be electrically connected to contacts (not illustrated) of the socket 710. The cover part 1520 may be press-fit into the through-hole 4H42 of the bezel 3 and may be smoothly connected to the lateral side (S of FIG. 2) of the electronic device 100 while blocking the through-hole 4H42.

Figure 16:
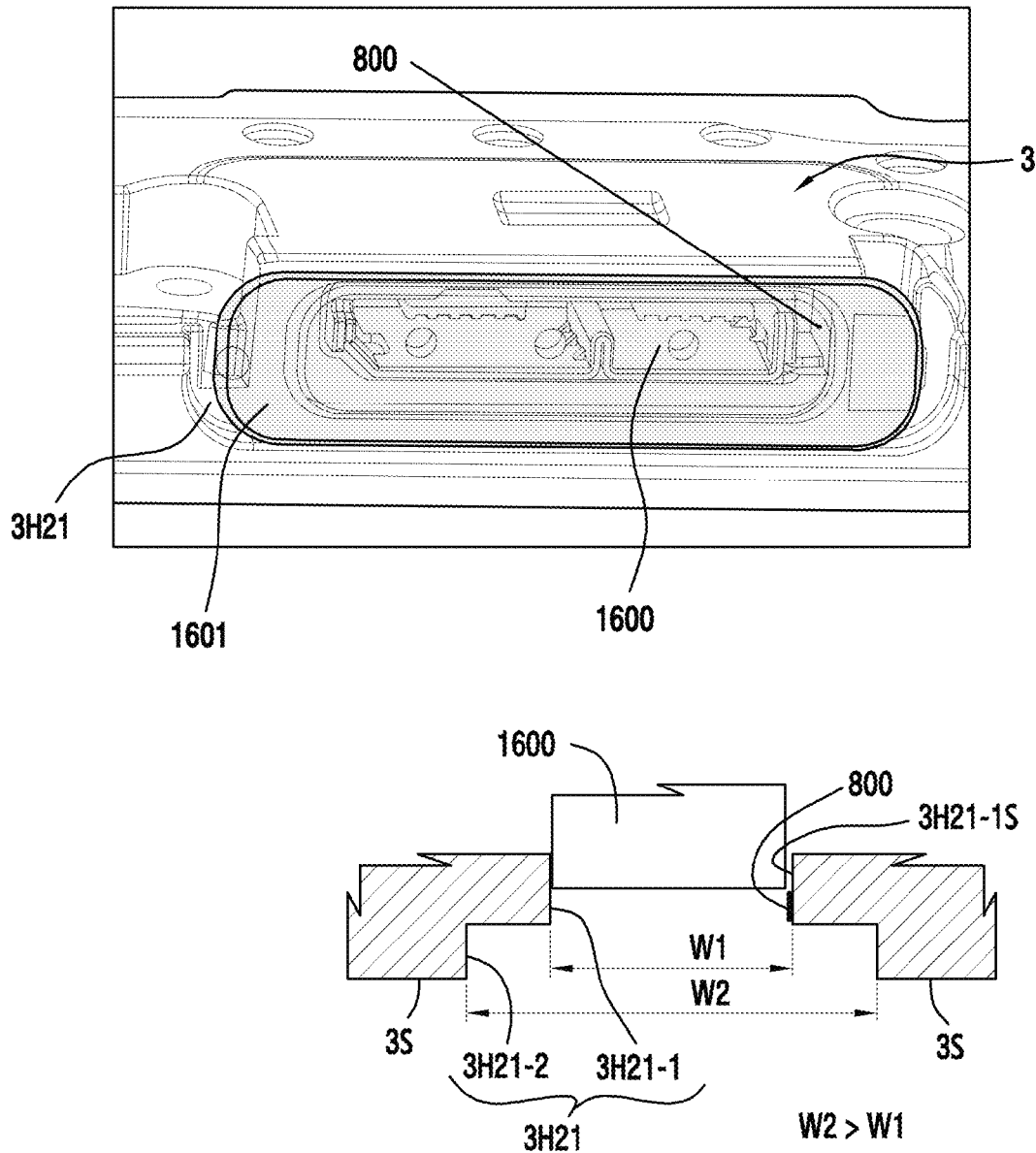
FIG. 16 illustrates a socket connector according to another embodiment of the present disclosure.

FIG. 16 illustrates a socket connector according to another embodiment of the present disclosure.

Referring to FIG. 16, the socket connector 1600 may be installed to be adjacent to the through-hole 3H21 formed in the third connecting side (S2 of FIG. 2) of the bezel 3. The socket connector 1600 may exist while being coupled to a recess-shaped portion (3H211 of FIG. 6F) that is formed in the bezel 3.

According to an embodiment of the present disclosure, the through-hole 3H21 may include a first through-hole 3H21-1 and a second through-hole 3H21-2 that interfaces with the first through-hole 3H21-1 and is disposed adjacent to the first through-hole 3H21-1. When viewed from the cross-section, the second through-hole 3H21-2 may have a larger width than the first through-hole 3H21-1 (W2>W1).

According to an embodiment of the present disclosure, the socket connector 1600 may be disposed in the first through-hole 3H21-1 and may not invade the space of the second through-hole 3H21-2.

According to an embodiment of the present disclosure, a wet-label 800 may be disposed on the passage surface 3H21-1S of the first through-hole 3H21-1. The passage surface 3H21-1S may be formed of an inclined surface or a curved surface in order to allow the wet-label 800 to be shown better through the through-hole 3H21.

According to an embodiment of the present disclosure, a cover 1601 may function to open and close the through-hole 3H21. For example, the cover 1601 may be press-fit into the second through-hole 3H21-2 and may block the through-hole 3H21. The cover 1601 may prevent water from being introduced through the through-hole 3H21.

According to an embodiment of the present disclosure, since the cover 1601 is flexible, the second through-hole 3H21-2 may be opened by pressing the cover 1601 into through-hole 3H21-1.

According to an embodiment of the present disclosure, the wet-label 800 disposed in the first through-hole 3H21-1 may be exposed externally while the cover 1601 is open.

Figure 17:
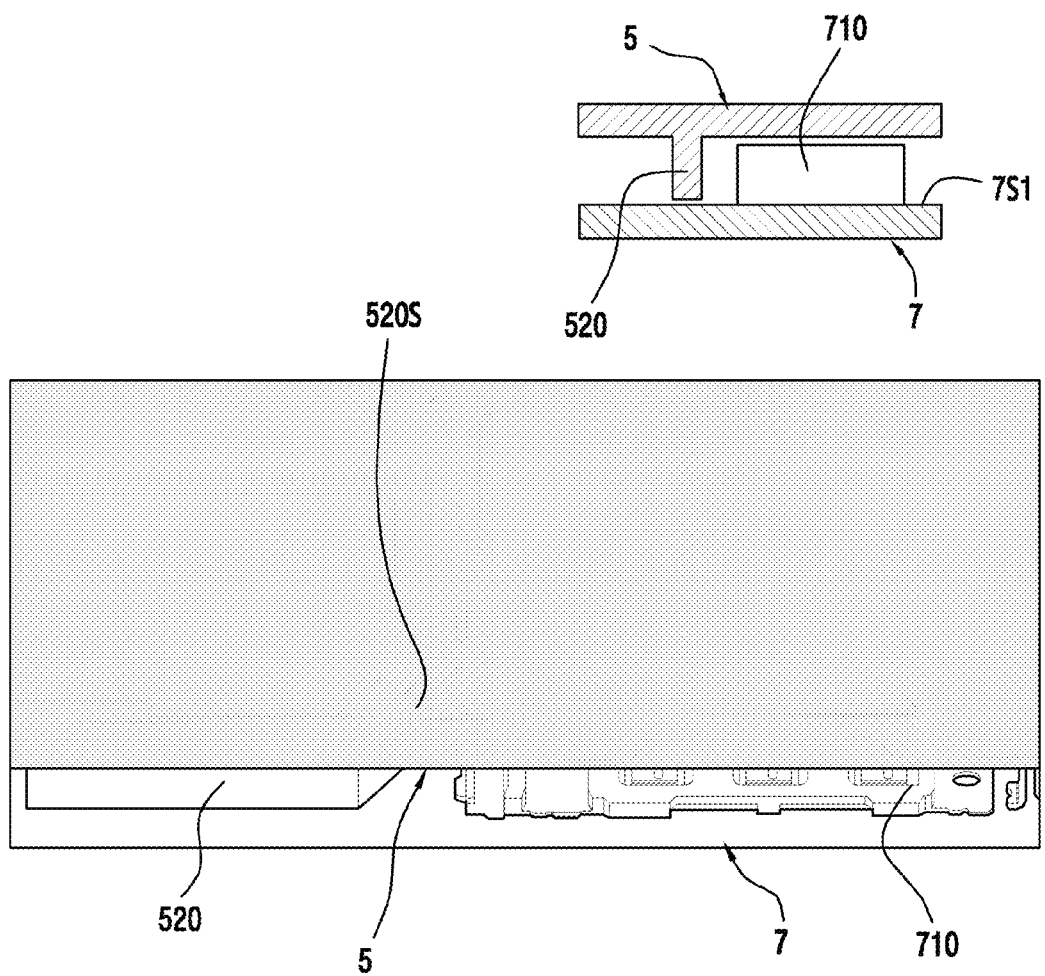
FIG. 17 illustrates a state in which the bracket and the circuit board are coupled to each other, according to another embodiment of the present disclosure.

FIG. 17 illustrates a state in which the bracket and the circuit board are coupled to each other, according to another embodiment of the present disclosure.

Referring to FIG. 17, the socket 710 mounted on the circuit board 7 may be disposed between the bracket 5 and the circuit board 7.

According to an embodiment of the present disclosure, the bracket 5 may include a structure or a rib 520 that extends toward the circuit board 7. The rib 520 may make contact with, or may be close to, the mounting surface 7S1 of the circuit board 7.

According to an embodiment of the present disclosure, the rib 520 of the bracket 5 may provide a wet-label mounting surface 520s which is adjacent to the socket 710 and on which a wet-label may be mounted. The wet-label mounting surface 520S may perform the same function as the above-described wet-label mounting surface 720S, and a detailed description thereof will be omitted.

Figure 18:
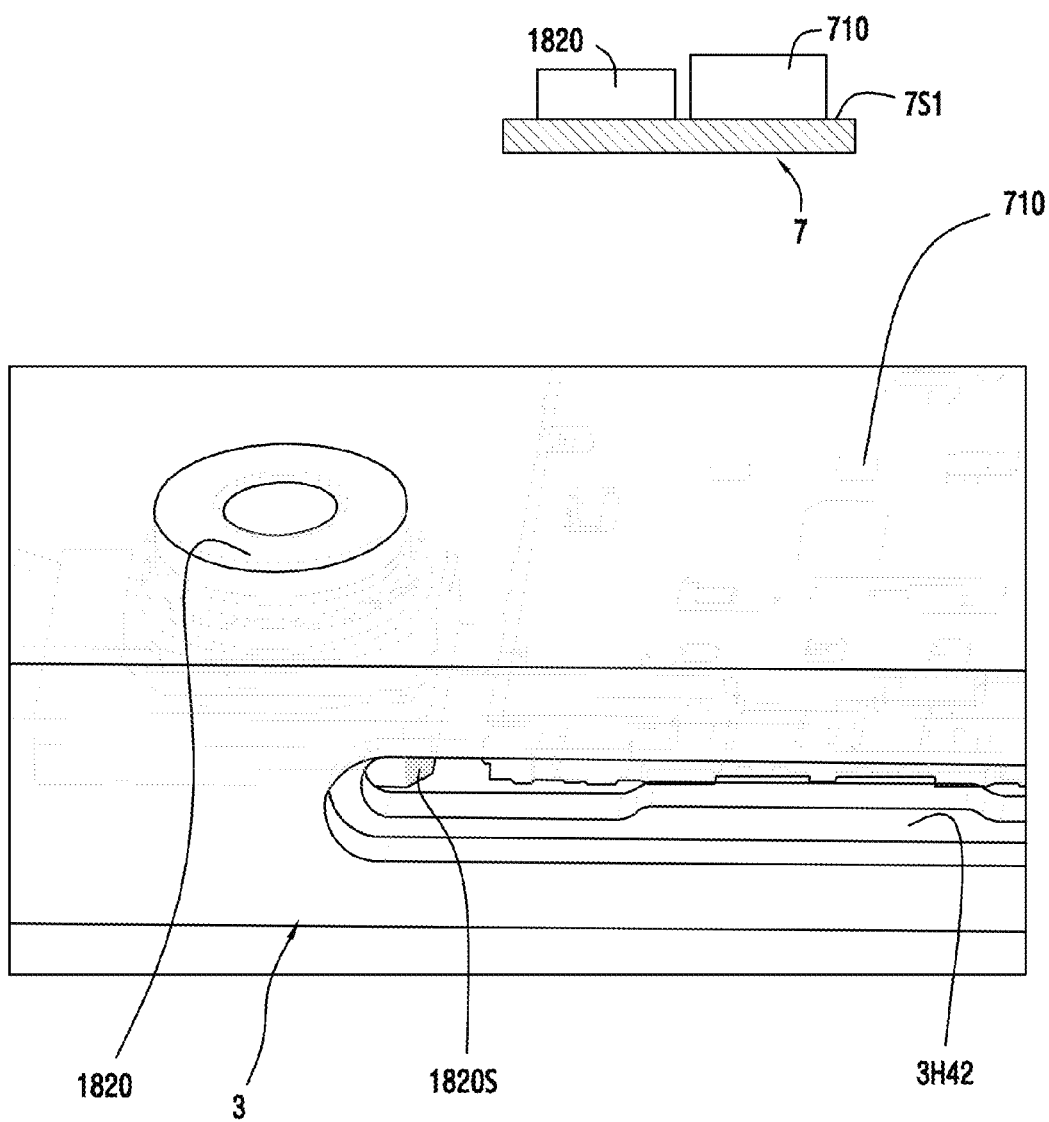
FIG. 18 and FIG. 19 illustrate an arrangement of a socket and a different electronic component, according to another embodiment of the present disclosure.
Figure 19:
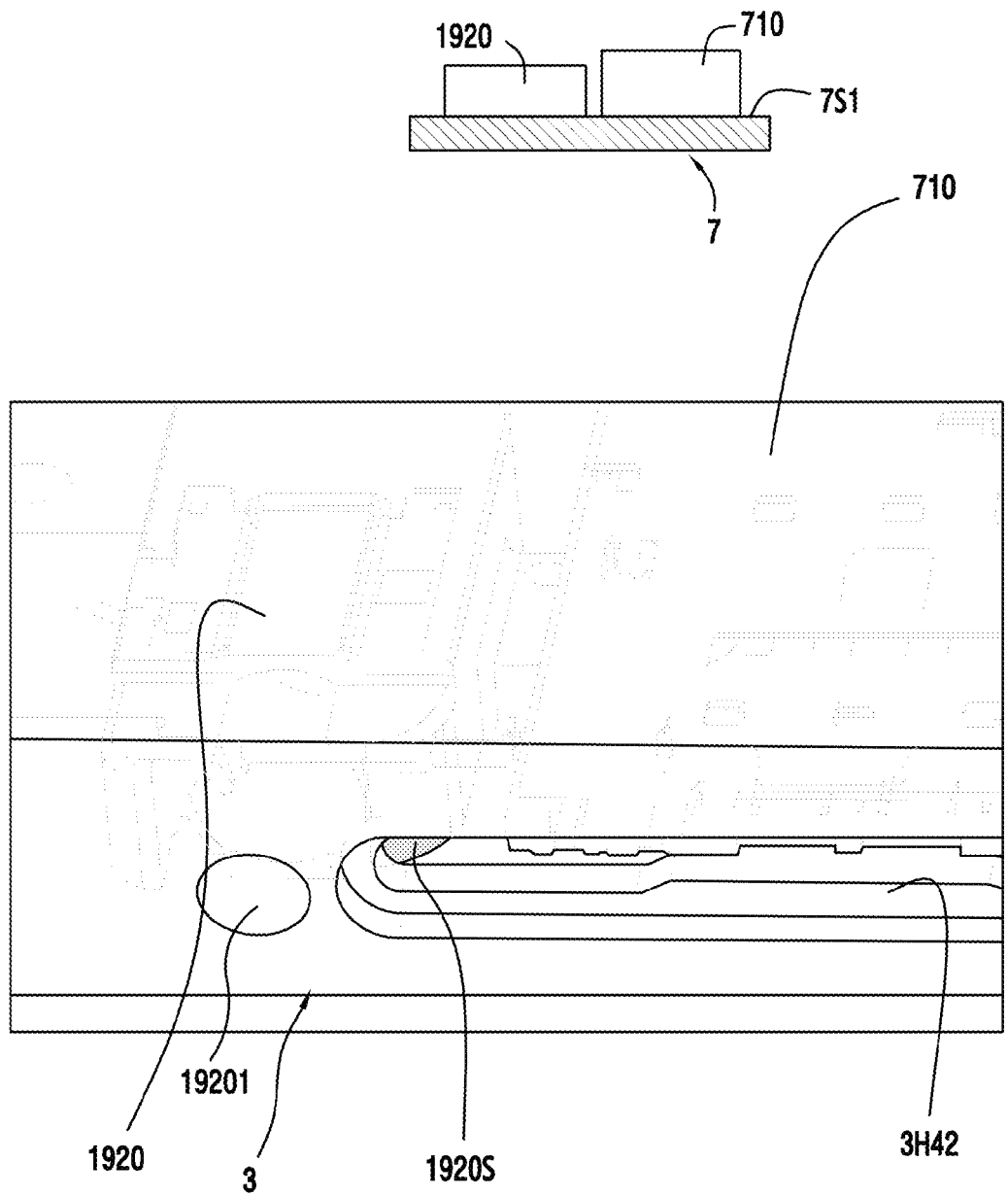

FIGS. 18 and 19 illustrate an arrangement of a socket and a different electronic component, according to another embodiment of the present disclosure.

Referring to FIGS. 18 and 19, at least one electronic component 1820 or 1920 may be disposed to be adjacent to the socket 710.

According to an embodiment of the present disclosure, the electronic component 1820 or 1920 and the socket 710 may be mounted on the same mounting surface 7S1 of the circuit board 7. Alternatively, the electronic component 1820 or 1920, although not illustrated, may be mounted on the bracket 5 or the bezel 3 and may be disposed to be adjacent to the socket 710.

According to an embodiment of the present disclosure, the electronic component 1820 or 1920 may provide a wet-label mounting surface 1820S or 1920S on which a wet-label may be mounted. The wet-label mounting surface 1820S or 1920S may perform the same function as the above-described wet-label mounting surface 720S, and a detailed description thereof will be omitted.

According to various embodiments of the present disclosure, the electronic component 1820 illustrated in FIG. 18 may include a camera. The electronic component 1920 illustrated in FIG. 19 may include an ear jack. A through-hole 19201 for supporting the ear jack may be disposed near the through-hole 3H42. In addition, a wet-label mounting surface, according to various embodiments of the present disclosure, may be configured for various other electronic components that are mounted to be adjacent to the socket 710.

According to various embodiments of the present disclosure, a wet-label mounting surface, according to various embodiments of the present disclosure, may be configured around at least one of the plurality of through-holes (e.g., 3H1, 3H21, 3H22, 3H23, 3H24, 3H31, 3H32, 3H41, 3H42, and 3HC2 of FIG. 2) that are formed in the electronic device 100.

Figure 20:
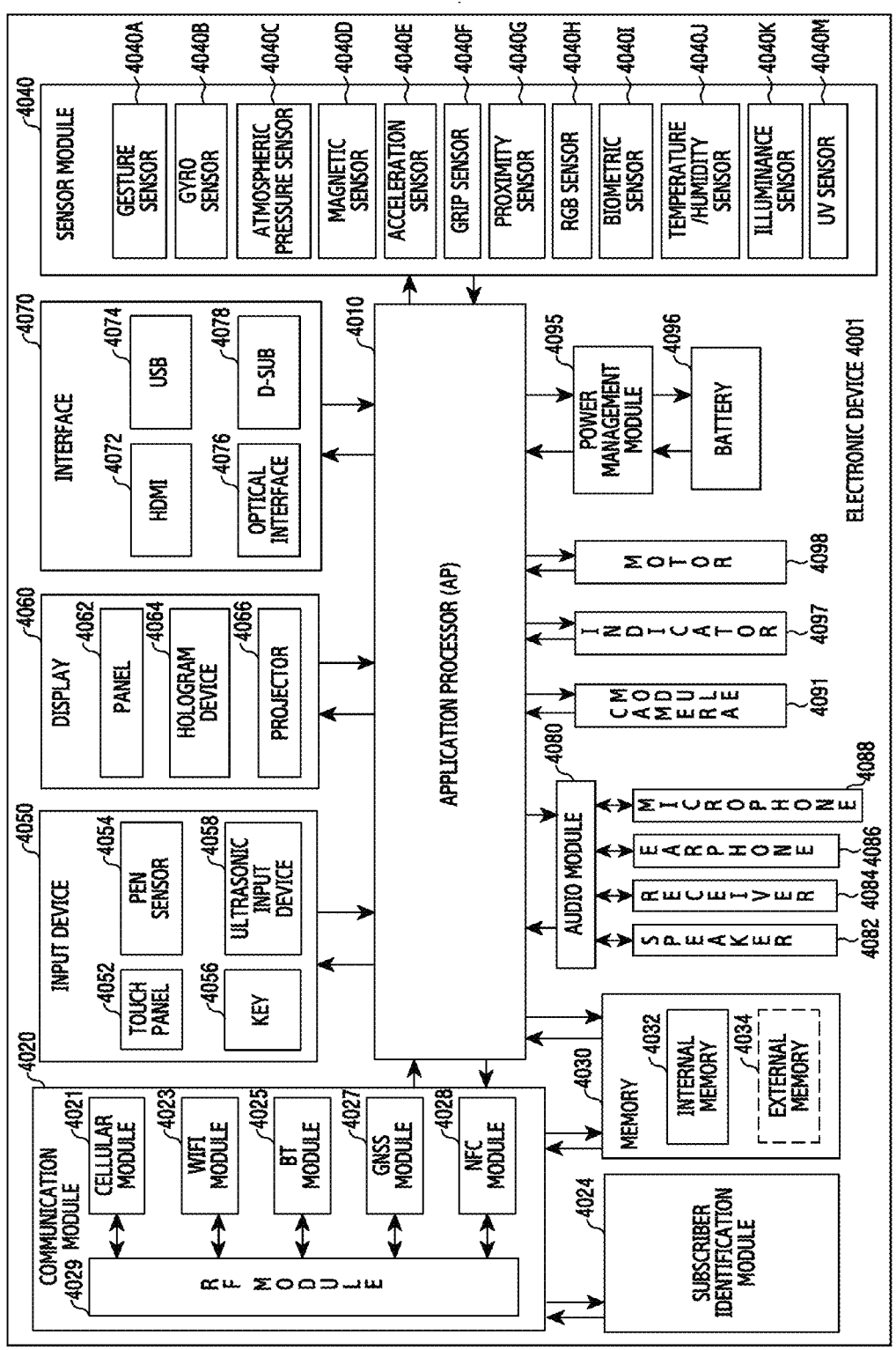
FIG. 20 is a block diagram of an electronic device according to various embodiments of the present disclosure.

FIG. 20 is a block diagram of an electronic device according to various embodiments of the present disclosure. The electronic device 4001 may include at least one processor (Application Processor (AP)) 4010, a communication module 4020, a subscriber identification module 4024, a memory 4030, a sensor module 4040, an input device 4050, a display 4060, an interface 4070, an audio module 4080, a camera module 4091, a power management module 4095, a battery 4096, an indicator 4097, and a motor 4098.

The processor 4010 may drive, for example, an operating system or application programs to control a plurality of hardware or software elements connected thereto and to perform various types of data processing and operations. The processor 4010 may be embodied as, for example, a System on Chip (SoC). According to an embodiment of the present disclosure, the processor 4010 may further include a Graphic Processing Unit (GPU) and/or an image signal processor. The processor 4010 may include at least some (e.g., a cellular module 4021) of the elements illustrated in FIG. 20. The processor 4010 may load, into a volatile memory, instructions or data received from at least one (e.g., a non-volatile memory) of the other elements, process the loaded instructions or data, and store various data in a non-volatile memory.

The communication module 4020 may include, for example, the cellular module 4021, a Wi-Fi module 4023, a Bluetooth module 4025, a GNSS module 4027 (e.g., a GPS module, a Glonass module, a Beidou module, or a Galileo module), an NFC module 4028, and a Radio Frequency (RF) module 4029.

The cellular module 4021 may provide, for example, a voice call, a video call, a text message service, an Internet service, etc. through a communication network. According to an embodiment of the present disclosure, the cellular module 4021 may distinguish and authenticate the electronic device 4001 within the communication network by using the subscriber identification module 4024 (e.g., a SIM card). According to an embodiment of the present disclosure, the cellular module 4021 may perform at least some of the functions that the processor 4010 may provide. According to an embodiment of the present disclosure, the cellular module 4021 may include a Communication Processor (CP).

The Wi-Fi module 4023, the Bluetooth module 4025, the GNSS module 4027, or the NFC module 4028 may include, for example, a processor for processing data that is transmitted and received through the corresponding module. According to some embodiments, at least some (e.g., two or more) of the cellular module 4021, the Wi-Fi module 4023, the Bluetooth module 4025, the GNSS module 4027, and the NFC module 4028 may be included in one Integrated Chip (IC) or IC package.

The RF module 4029 may transmit/receive, for example, a communication signal (e.g., an RF signal). The RF module 4029 may include, for example, a transceiver, a Power Amp Module (PAM), a frequency filter, a Low Noise Amplifier (LNA), an antenna, etc. According to another embodiment, at least one of the cellular module 4021, the Wi-Fi module 4023, the Bluetooth module 4025, the GNSS module 4027, and the NFC module 4028 may transmit/receive an RF signal through a separate RF module.

The subscriber identification module 4024 may include, for example, a card that includes a subscriber identification module and/or an embedded SIM, and may contain unique identification information (e.g., an Integrated Circuit Card Identifier (ICCID)) or subscriber information (e.g., an International Mobile Subscriber Identity (IMSI)).

The memory 4030 may include, for example, an internal memory 4032 or an external memory 4034. The internal memory 4032 may include at least one of, for example, a volatile memory (e.g., a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard disc drive, or a Solid State Drive (SSD)).

The external memory 4034 may further include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, etc. The external memory 4034 may be functionally and/or physically connected to the electronic device 4001 through various interfaces.

The sensor module 4040, for example, may measure a physical quantity or detect the operating state of the electronic device 4001 and may convert the measured or detected information into an electrical signal. The sensor module 4040 may include, for example, at least one of a gesture sensor 4040A, a gyro sensor 4040B, an atmospheric pressure sensor 4040C, a magnetic sensor 4040D, an acceleration sensor 4040E, a grip sensor 4040F, a proximity sensor 4040G, a color sensor 4040H (e.g., a Red, Green, Blue (RGB) sensor), a biometric sensor 4040I, a temperature/humidity sensor 4040J, an illumination sensor 4040K, and a ultraviolet (UV) sensor 4040M. Additionally or alternatively, the sensor module 4040 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 4040 may further include a control circuit for controlling one or more sensors included therein. In some embodiments, the electronic device 4001 may further include a processor, as a part of the processor 4010 or separately from the processor 4010, which is configured to control the sensor module 4040, and may control the sensor module 4040 while the processor 4010 is in a sleep state.

The input device 4050 may include, for example, a touch panel 4052, a (digital) pen sensor 4054, a key 4056, or an ultrasonic input device 4058. The touch panel 4052 may use at least one of, for example, a capacitive type, a resistive type, an infrared type, and an ultrasonic type. Furthermore, the touch panel 4052 may further include a control circuit. The touch panel 4052 may further include a tactile layer to provide a tactile reaction to a user.

The (digital) pen sensor 4054 may include, for example, a recognition sheet which is a part of the touch panel or is separate from the touch panel. The key 4056 may include, for example, a physical button, an optical key or a keypad. The ultrasonic input device 4058 may detect ultrasonic waves, which are generated by an input tool, through a microphone (e.g., a microphone 4088) and may identify data corresponding to the detected ultrasonic waves.

The display 4060 may include a panel 4062, a hologram device 4064, or a projector 4066. The panel 4062 may be embodied to be, for example, flexible, transparent, or wearable. The panel 4062, together with the touch panel 4052, may be configured as a single module. The hologram device

4064 may show a three-dimensional image in the air by using interference of light. The projector 4066 may display an image by projecting light onto a screen. The screen may be located, for example, in the interior of, or on the exterior of, the electronic device 4001. According to an embodiment of the present disclosure, the display 4060 may further include a control circuit for controlling the panel 4062, the hologram device 4064, or the projector 4066.

The interface 4070 may include, for example, a High-Definition Multimedia Interface (HDMI) 4072, a Universal Serial Bus (USB) 4074, an optical interface 4076, or a D-subminiature (D-sub) 4078. Additionally or alternatively, the interface 4070 may include, for example, a Mobile High-definition Link (MHL) interface, a Secure Digital (SD) card/Multi-Media Card (MMC) interface, or an Infrared Data Association (IrDA) standard interface.

The audio module 4080, for example, may convert a sound into an electrical signal, and vice versa. The audio module 4080 may process sound information that is input or output through, for example, a speaker 4082, a receiver 4084, earphones 4086, the microphone 4088, etc.

The camera module 4091 is a device that can photograph a still image and a moving image. According to an embodiment, the camera module 4091 may include one or more image sensors (e.g., a front sensor or a rear sensor), a lens, an Image Signal Processor (ISP), or a flash (e.g., an LED, a xenon lamp, etc.).

The power management module 4095 may manage, for example, the power of the electronic device 4001. According to an embodiment of the present disclosure, the power management module 4095 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, etc. Additional circuits (e.g., a coil loop, a resonance circuit, a rectifier, etc.) for wireless charging may be further included. The battery gauge may measure, for example, a residual quantity of the battery 4096, and a voltage, a current, or a temperature while charging. The battery 4096 may include, for example, a rechargeable battery and/or a solar battery.

The indicator 4097 may indicate a particular state (e.g., a booting state, a message state, a charging state, etc.) of the electronic device 4001 or a part thereof (e.g., the processor 4010). The motor 4098 may convert an electrical signal into a mechanical vibration and may generate a vibration, a haptic effect, etc. Although not illustrated, the electronic device 4001 may include a processing unit (e.g., a GPU) for mobile TV support. The processing unit for mobile TV support may process media data according to standards, such as, for example, Digital Multimedia Broadcasting (DMB), Digital Video Broadcasting (DVB), mediaFLO™, etc.

According to various embodiments of the present disclosure, an electronic device may include: a housing having a through-hole that connects the inside and the outside of the electronic device; a first structure that is accommodated in a space of the housing and has an opening and a passage, wherein the opening is disposed adjacent to the through-hole and the passage extends in a first direction and is connected to the opening; a second structure that is accommodated in the space of the housing and is disposed adjacent to the first structure; and a label that is coupled to a mounting surface formed on the second structure and changes color when being brought into contact with water. The through-hole may have an extension that further protrudes beyond the opening in a second direction from one end to the other end of the opening. The mounting surface may extend from the vicinity of an end of the extension and may gradually increase in size in the opposite direction to the second direction toward the first direction.

According to various embodiments of the present disclosure, the mounting surface may become closer to the first structure along the first direction.

According to various embodiments of the present disclosure, the mounting surface may be a flat surface, and the plane direction of the mounting surface and the first direction may make an acute angle.

According to various embodiments of the present disclosure, the mounting surface may have a curved surface.

According to various embodiments of the present disclosure, the first structure may include an audio device that discharges a sound to the outside of the housing through the passage and introduces a sound into the housing through the passage.

According to various embodiments of the present disclosure, the first structure may include an optical device that sends light to the outside of the housing through the passage and introduces light into the housing through the passage.

According to various embodiments of the present disclosure, the first structure may include a socket by which a component is inserted into the passage through the through-hole from the outside of the housing. Here, the first direction and the direction in which the component is inserted may agree with each other.

According to various embodiments of the present disclosure, the component may include a SIM card or a memory.

According to various embodiments of the present disclosure, the component may include a plug of another electronic device.

According to various embodiments of the present disclosure, the second structure may be formed of a metal or non-metal.

According to various embodiments of the present disclosure, the second structure may include an electronic component electrically connected to the electronic device.

According to various embodiments of the present disclosure, the second structure may include a camera or an ear jack.

According to various embodiments of the present disclosure, the second structure may include a grounding body.

According to various embodiments of the present disclosure, the second structure may include a portion that extends from the housing.

According to various embodiments of the present disclosure, the electronic device may further include a circuit board accommodated in the space of the housing. The first structure may be mounted on the circuit board.

According to various embodiments of the present disclosure, the second structure may be mounted on the circuit board.

According to various embodiments of the present disclosure, the second structure may be installed in the housing.

According to various embodiments of the present disclosure, the housing may include: a front glass cover that forms the front side of the electronic device; a back glass cover that forms the back side of the electronic device; and a metal bezel that surrounds the space formed by the front glass cover and the back glass cover. Here, the through-hole may be formed in the metal bezel.

According to various embodiments of the present disclosure, the electronic device may include a display that is accommodated in the space formed by the front glass cover and the back glass cover and has a screen area exposed through the front glass cover.

According to various embodiments of the present disclosure, a portable electronic device may include: a housing having a through-hole that connects the inside and the outside of the electronic device; a socket that is accommodated in the space of the housing and has an opening disposed adjacent to the through-hole and a passage into which a memory is inserted through the through-hole from the outside of the housing; a structure that is accommodated in the space of the housing and is disposed adjacent to the socket; and a label that is coupled to a mounting surface formed on the structure and changes color when being brought into contact with water. The through-hole may have an extension that further protrudes beyond the opening in a first direction from one end to the other end of the opening. The mounting surface may extend from the vicinity of an end of the extension and may gradually increase in size in the opposite direction to the first direction toward the insertion direction of the memory.

According to various embodiments of the present disclosure, an electronic device may include: an external housing having a portion of a through-hole that connects the inside and the outside of the electronic device; a first structure that is accommodated in a space of the external housing and has an opening and a passage, wherein the opening is disposed adjacent to the through-hole and the passage extends in a first direction and is connected to the opening; a second structure that is accommodated in the space of the external housing and disposed adjacent to the first structure, and has a portion directed toward the through-hole; and a material that is located on the portion of the second structure so as to be visible from the outside through the through-hole and changes color in reaction to contact of a fluid.

According to various embodiments of the present disclosure, the fluid may be water.

According to various embodiments of the present disclosure, the second structure may be at least partially spaced apart from a portion of the external housing.

According to various embodiments of the present disclosure, the through-hole is wider than the opening in the first structure by an extension, wherein a space is formed between the first structure and the second structure from the extension in a second direction.

According to various embodiments of the present disclosure, the portion of the second structure, which is directed toward the through-hole, may extend from the vicinity of an end of the extension and may gradually increase in size in the opposite direction to the second direction toward the first direction.

According to various embodiments of the present disclosure, the external housing may include: a first surface (e.g., a front surface of a front cover); a second surface (e.g., a back surface of a back cover) opposite to the first surface; and a third surface (e.g., a surface of a side wall) that at least partially surrounds the internal space formed between the first surface and the second surface. Here, the through-hole may be formed on the third surface.

According to various embodiments of the present disclosure, first surface and the second surface substantially are substantially similar, when viewed from the first surface to the second surface. The first surface and the second surface are a substantially rectangular shape comprising first and second short edges opposite to each other, and third and fourth long edges opposite to each other. The through-hole is disposed between the first short edge of the first surface and the first short edge of the second surface.

According to various embodiments of the present disclosure, the portion of the second structure, which is directed toward the through-hole, may become closer to the first structure toward the first direction.

According to various embodiments of the present disclosure, the portion of the second structure, which is directed toward the through-hole, may be a flat surface, and the first direction and a plane direction of the portion of the second structure, which is directed toward the through-hole, may make an acute angle.

According to various embodiments of the present disclosure, the portion of the second structure, which is directed toward the through-hole, may have a curved surface.

According to various embodiments of the present disclosure, the first structure may include an audio device that discharges a sound to the outside of the external housing through the passage or introduces a sound into the external housing through the passage.

According to various embodiments of the present disclosure, the first structure may include an optical device that sends light to the outside of the external housing through the passage or introduces light into the external housing through the passage.

According to various embodiments of the present disclosure, the first structure may include a socket configured to receive a component by insertion of the component into the passage through the through-hole from the outside of the external housing, and the first direction and the direction in which the component is inserted are the same.

According to various embodiments of the present disclosure, the component may include at least one of a SIM card or a memory.

According to various embodiments of the present disclosure, the component may include a plug of another electronic device.

According to various embodiments of the present disclosure, the second structure may be formed of a metal or non-metal.

According to various embodiments of the present disclosure, the second structure may include an electronic component electrically connected to the electronic device.

According to various embodiments of the present disclosure, the second structure may include a camera or an ear jack.

According to various embodiments of the present disclosure, the second structure may include a grounding body.

According to various embodiments of the present disclosure, the second structure may include a portion that extends from the external housing.

According to various embodiments of the present disclosure, the portable electronic device may further include a circuit board accommodated in the space of the external housing, and the first structure may be mounted on the circuit board.

According to various embodiments of the present disclosure, the second structure may be mounted on the circuit board.

According to various embodiments of the present disclosure, the second structure may be installed in the housing.

According to various embodiments of the present disclosure, the external housing may include: a front glass cover that forms a front side of the electronic device; a back glass cover that forms a back side of the electronic device; and a metal bezel that surrounds the space formed by the front glass cover and the back glass cover. Here, the through-hole may be formed in the metal bezel.

According to various embodiments of the present disclosure, the portable electronic device may further include a display that is accommodated in the space formed by the front glass cover and the back glass cover and has a screen area exposed through the front glass cover.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Various embodiments of the present disclosure disclosed in this specification and the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

What is claimed is:

1. An electronic device comprising:
   an external housing having a through-hole that connects the inside and the outside of the electronic device;
   a first structure that is accommodated in a space of the external housing and has an opening and a passage, wherein the opening is disposed adjacent to the through-hole and the passage extends in a first direction and is connected to the opening;
   a second structure that is accommodated in the space of the external housing and disposed adjacent to the first structure, and has a portion directed toward the through-hole; and
   a material that is located on the portion of the second structure so as to be shown from the outside through the through-hole and changes color in reaction to contact of a fluid,
   wherein the through-hole is wider than the opening in the first structure by an extension, wherein a space is formed between the first structure and the second structure from the extension in a second direction.

2. The electronic device of claim 1, wherein the second structure is at least partially spaced apart from a portion of the external housing.

3. The electronic device of claim 1, wherein the portion of the second structure, which is directed toward the through-hole, extends from the vicinity of an end of the extension and gradually increases in size in the opposite direction to the second direction toward the first direction.

4. The electronic device of claim 1, wherein the external housing comprises:
   a first surface;
   a second surface opposite to the first surface; and
   a third surface that at least partially surrounds an internal space formed between the first surface and the second surface,
   wherein the through-hole is formed on third surface.

5. The electronic device of claim 4, wherein the first surface and the second surface substantially are substantially similar, when viewed from the first surface to the second surface,
   wherein the first surface and the second surface are a substantially rectangular shape comprising first and second short edges opposite to each other, and third and fourth long edges opposite to each other, and
   wherein the through-hole is disposed between the first short edge of the first surface and the first short edge of the second surface.

6. The electronic device of claim 1, wherein the portion of the second structure, which is directed toward the through-hole, becomes closer to the first structure toward the first direction.

7. The electronic device of claim 1, wherein the portion of the second structure, which is directed toward the through-hole, is a flat surface, and the first direction and a plane direction of the portion of the second structure, which is directed toward the through-hole, makes an acute angle.

8. The electronic device of claim 1, wherein the portion of the second structure, which is directed toward the through-hole, has a curved surface.

9. The electronic device of claim 1, wherein the first structure comprises an audio device that discharges a sound to the outside of the external housing through the passage or introduces a sound into the external housing through the passage, or
   wherein the first structure comprises an optical device that sends light to the outside of the external housing through the passage or introduces light into the external housing through the passage.

10. The electronic device of claim 1, wherein the first structure comprises a socket configured to receive a component by insertion of the component into the passage through the through-hole from the outside of the external housing, wherein the first direction and the direction in which the component is inserted are the same.

11. The electronic device of claim 10, wherein the component comprises at least one of a SIM card, a memory, and a plug of another electronic device.

12. The electronic device of claim 1, wherein the second structure is formed of a metal or non-metal.

13. The electronic device of claim 1, wherein the second structure comprises an electronic component electrically connected to the electronic device.

14. The electronic device of claim 13, wherein the second structure comprises a camera or an ear jack or a grounding body.

15. The electronic device of claim 1, wherein the second structure comprises a portion that extends from the external housing.

16. The electronic device of claim 1, further comprising:
   a circuit board accommodated in the space of the external housing,
   wherein the first structure is mounted on the circuit board.

17. The electronic device of claim 16, wherein the second structure is mounted on the circuit board or the external housing.

18. The electronic device of claim 1, wherein the external housing comprises:
   a front glass cover that forms a front side of the electronic device;
   a back glass cover that forms a back side of the electronic device; and a metal bezel that surrounds the space formed by the front glass cover and the back glass cover, wherein the through-hole is formed in the metal bezel.

19. The electronic device of claim 18, further comprising:
a display that is accommodated in the space formed by the front glass cover and the back glass cover and has a screen area exposed through the front glass cover.

* * * * *